(12) United States Patent
Long et al.

(10) Patent No.: US 9,009,066 B2
(45) Date of Patent: Apr. 14, 2015

(54) ADVERTISEMENT MANAGEMENT FOR LIVE INTERNET MULTIMEDIA CONTENT

(75) Inventors: Dustin W. Long, Herriman, UT (US); David F. Brueck, Saratoga Springs, UT (US); Kenneth A. Brueck, Lehi, UT (US)

(73) Assignee: EchoStar Technologies L.L.C., Englewood, CO (US)

( * ) Notice: Subject to any disclaimer, the term of this patent is extended or adjusted under 35 U.S.C. 154(b) by 1177 days.

(21) Appl. No.: 12/370,568

(22) Filed: Feb. 12, 2009

(65) Prior Publication Data

US 2010/0205049 A1 Aug. 12, 2010

(51) Int. Cl.
G06Q 30/00 (2012.01)
H04H 20/14 (2008.01)
H04N 7/10 (2006.01)
G06Q 30/02 (2012.01)

(52) U.S. Cl.
CPC ............ *G06Q 30/02* (2013.01); *G06Q 30/0252* (2013.01); *G06Q 30/0277* (2013.01)

(58) Field of Classification Search
CPC ...... G06Q 30/02; H04H 20/14; H04N 21/812
USPC ........ 705/14.68, 14.73, 10, 32; 725/22, 32, 9, 725/10, 14, 34, 35, 46; 386/243, 343, 386/343.1; 348/607, 9, 10, 12
See application file for complete search history.

(56) References Cited

U.S. PATENT DOCUMENTS

| | | | |
|---|---|---|---|
| 4,535,355 A | 8/1985 | Arn et al. | |
| 5,953,506 A | 9/1999 | Kalra et al. | |
| 5,996,007 A | 11/1999 | Klug et al. | |
| 6,195,680 B1 | 2/2001 | Goldszmidt et al. | |
| 6,366,614 B1 | 4/2002 | Pian et al. | |
| 6,490,627 B1 | 12/2002 | Kalra et al. | |
| 6,574,591 B1 | 6/2003 | Kleiman et al. | |
| 6,604,118 B2 | 8/2003 | Kleiman et al. | |
| 6,976,090 B2 | 12/2005 | Ben-Shaul et al. | |
| 7,240,100 B1 | 7/2007 | Wein et al. | |
| 7,523,181 B2 | 4/2009 | Swildens et al. | |
| 7,548,962 B2 | 6/2009 | Weber et al. | |

(Continued)

FOREIGN PATENT DOCUMENTS

WO    2005086865 A2    9/2005

OTHER PUBLICATIONS

US International Searching Authority "International Search Report," mailed Mar. 30, 2010; International Application No. PCT/US2010/023789, filed Feb. 10, 2010.

(Continued)

*Primary Examiner* — Sun Li

(74) *Attorney, Agent, or Firm* — Ingrassia Fisher & Lorenz, P.C.

(57) ABSTRACT

Managing advertisements for multimedia content delivered over the Internet for a live event. In one embodiment, the method receives the multimedia content over a network connection for playback on a media player, and receives a first advertisement marker that indicates a first start time and a first scheduled duration of a first advertisement break. The method adjust the first scheduled duration to a first adjusted portion, and selects one or more advertisements for playback on the media player to fill the first adjusted duration of the first advertisement break, instead of the first scheduled duration.

31 Claims, 11 Drawing Sheets

(56) References Cited

U.S. PATENT DOCUMENTS

| | | |
|---|---|---|
| 7,730,509 B2 | 6/2010 | Boulet et al. |
| 2002/0152318 A1 | 10/2002 | Menon et al. |
| 2003/0005052 A1 | 1/2003 | Feuer et al. |
| 2003/0014684 A1 | 1/2003 | Kashyap |
| 2003/0023973 A1 | 1/2003 | Monson et al. |
| 2003/0058707 A1 | 3/2003 | Dilger et al. |
| 2003/0070167 A1* | 4/2003 | Holtz et al. .................. 725/32 |
| 2003/0151753 A1 | 8/2003 | Li et al. |
| 2003/0154239 A1 | 8/2003 | Davis et al. |
| 2004/0083283 A1 | 4/2004 | Sundaram et al. |
| 2004/0103444 A1 | 5/2004 | Weinberg et al. |
| 2005/0076359 A1* | 4/2005 | Pierson et al. ............... 725/32 |
| 2005/0108414 A1 | 5/2005 | Taylor et al. |
| 2005/0120107 A1 | 6/2005 | Kagan et al. |
| 2005/0149968 A1 | 7/2005 | Konig et al. |
| 2005/0188051 A1 | 8/2005 | Sneh |
| 2006/0080718 A1 | 4/2006 | Gray et al. |
| 2006/0206246 A1 | 9/2006 | Walker |
| 2006/0287912 A1* | 12/2006 | Raghuvamshi ................. 705/14 |
| 2008/0155591 A1 | 6/2008 | Mahajan et al. |
| 2008/0219151 A1 | 9/2008 | Ma et al. |
| 2008/0260352 A1 | 10/2008 | Turner |
| 2008/0288974 A1 | 11/2008 | Dierlam et al. |
| 2008/0306818 A1 | 12/2008 | Evans et al. |
| 2008/0313029 A1 | 12/2008 | Evans |
| 2009/0210300 A1 | 8/2009 | Cansler et al. |
| 2009/0210899 A1 | 8/2009 | Lawrence-Apfelbaum et al. |
| 2010/0023960 A1 | 1/2010 | Hasson |
| 2010/0088716 A1 | 4/2010 | Ellanti et al. |

OTHER PUBLICATIONS

USPTO "International Search Report" mailed Dec. 12, 2008; International Appln. No. PCT/US2008/061035, filed Apr. 21, 2008.

* cited by examiner

ADVERTISEMENT MANAGEMENT FOR LIVE INTERNET MULTIMEDIA CONTENT

TECHNICAL FIELD

Embodiments of the invention relate to the field of delivery of multimedia content over the Internet; and more specifically, to the advertisement management for multimedia content for a live event delivered over the Internet.

BACKGROUND

The Internet is becoming a primary method for distributing multimedia content and other information to end users. It is currently possible to download music, video, games, and other multimedia information to computers, cell phones, and virtually any network capable device.

Streaming of data files or "streaming media" refers to technology that delivers sequential multimedia content at a rate sufficient to present the multimedia to a user at the originally anticipated playback speed without significant interruption. Streamed data may be stored in memory (e.g., hard drive, etc) until the data is played back and then subsequently deleted after a defined time period has passed. Streaming may be used to deliver multimedia content on-demand from previously-recorded broadcasts or multimedia content from live broadcasts.

Alternatively, multimedia content may be downloaded and stored on persistent storage devices, such as hard drives or optical storage, for later presentation. Downloading complete media files of the multimedia content can take large amounts of time depending on the network connection. Once downloaded, however, the multimedia content can be viewed repeatedly anytime or anywhere. Users generally dislike this option, as they tend to want to see or hear the media file instantaneously. Streaming, unlike downloading, provides the opportunity for a user to select different multimedia content for viewing on an ad hoc basis, while downloading is by definition restricted to receiving a specific content selection in its entirety or not at all.

Another technology, known as "progressive downloads," attempts to combine the strengths of the above two technologies. When a progressive download is initiated, the media file download begins, and the media player waits to begin playback until there is enough of the file downloaded that playback can begin with the hope that the remainder of the file will be completely downloaded before playback "catches up." This waiting period before playback can be substantial, depending on network conditions, and therefore is not a complete or fully acceptable solution to the problem of media presentation over a network.

In most multimedia content streaming systems, the user can start viewing the requested content without waiting for the entire media file to completely download. Streaming offers the advantage of immediate access to the content, but may need to sacrifice quality in order to maintain uninterrupted playback within the constraints of the available bandwidth of the network connection. Network failures or congestion also impact streaming multimedia content.

One concern that arises in the context of distribution of multimedia content over the Internet, regardless of the method used for delivering the multimedia content, is how to manage advertisements. Conventionally, in the case of live broadcast television, the broadcaster is in complete control of timing of the insertion and playback of advertisements. For example, if a 30-second advertisement is to be inserted, the advertisement is selected and scheduled beforehand, and the advertisement starts and ends immediately at the scheduled time. This is possible because the broadcaster is in complete control of all the equipment and multimedia content (regular programming plus advertisements) involved. In addition, all viewers see or hear the same advertisement at the same time. The viewers are human beings who watch or listen to the multimedia content using a television or radio. When the time to insert an advertisement arrives, the broadcaster inserts an advertisement into the output signal. The advertisement includes content which was previously positioned in the video equipment, which is capable of delivering the content into the output signal at the precise instant that it is called for, with very high reliability. In effect, all viewers see the same advertising at the same point in the multimedia content, such as that of a live event. The device used for playing the multimedia content, such as a television, is not involved in implementing selecting the advertisements.

As for Internet-based multimedia content, one conventional approach inserts advertising into the video stream at some point no later than the media server or the equivalent, meaning the advertisements are encoded as an integral part of the multimedia content. Like conventional broadcasting, using this conventional approach, all viewers see the same advertising at the same point in the multimedia content, such as that of a live event, and a media player, operating on a networked device, is not involved in selecting the advertisements. The media player is a piece of software that plays the multimedia content (e.g., displays video and plays audio), and may be a standalone software application, a web browser plug-in, a combination of browser plug-in and supporting web page logic, or the like.

In the case of managing advertisements for on-demand, Internet-based multimedia content, sometimes referred to as video-on-demand (VOD), the timing for advertisement insertion may be very flexible. For example, the VOD content may be a previously-recorded broadcast, as opposed to multimedia content from a "live" broadcast. In this context, "live" means that the multimedia content is anchored to a particular point in time for the purpose of playing the multimedia content. That is, the beginning of the piece of content is scheduled to be played by a media player at a particular point in time. In some cases, the multimedia content of the live event is played out at the same time that the content is being encoded, and the anchor point is the time that the encoding of the event began. In other cases, the multimedia content of a live event may be pre-encoded, but scheduled to play out at a particular point in time. In either case, the playback of the content is required to occupy approximately the same amount of time as the original live event, in order to keep the playback of the multimedia content synchronized with the schedule. For live playback, the duration of advertisement breaks during playback should approximate the duration of the advertisement breaks as they were encoded. Live playback (sometimes referred to as live playout) differs from VOD playback in that, with VOD content, there is no anchor point in real time. A piece of VOD content begins playing when a viewer requests the VOD content. There is no requirement that the duration of advertisement breaks be the same as the duration of the original advertisement breaks, during the playback of the VOD content. In fact, it is common for the duration of the advertisement breaks to be quite different in the VOD content than from the original broadcast (e.g., for television). For example, an original television broadcast may be shown at a particular point in time, and subsequently, the publisher makes the television broadcast available as VOD content, but without the original advertisements in the original television broadcast. Since the VOD content is not anchored to a particular schedule, the advertisements in the VOD content do not have to match the duration of the original advertisements.

For VOD advertisement insertion, advertisement breaks are typically marked at particular points in the video content, although their locations might also be computed based on the amount of time the viewer has been viewing or by some other means. Advertisement breaks are not required to occupy any particular duration of time. In particular, the advertisements in the VOD content do not have to match the original advertisement breaks in the program content. In fact, the number and duration of advertisements played during a particular advertisement break in the VOD content may vary from viewer to viewer.

For VOD advertisement insertion, when playback reaches an advertisement break, playback of the program content is suspended while the advertisements are played. If there are brief pauses as advertisements are fetched, or even during the playback of an advertisement, the viewer's experience during the advertisement break may be affected, but this has no bearing on the viewer's experience after the program content resumes. For example, in a VOD scenario, there is no concept of "lag behind live," because the event is pre-recorded and is available in its entirety before playback begins. The term "lag behind live," as used herein, refers to the difference between when a particular piece of content is encoded for Internet distribution and when a particular viewer views the piece of content on the media player. The "lag behind live" can vary between viewers and can vary over time for a single viewer. For a particular live event, delivered by a particular technology, there is a minimum lag behind live due to the time to record, or otherwise capture the live event and to make the recorded content available for Internet distribution, for example.

The concept of "lag behind live" only applies to live events, not to pre-recorded multimedia content, unless the pre-recorded multimedia content is scheduled to be played back at a particular point in time. In effect, for VOD content, there is no live point to which the viewer should be restored after an advertisement break. Advertisement breaks for VOD content can be of any duration without affecting the viewer's experience of the regular program content.

Since advertising is inserted into the live video stream of a live event before the media server in one conventional system, all viewers seeing the live event see the same advertisement at the same time. The publisher cannot control how many viewers see the advertisements. In general, there is no good way to take advantage of knowing how many viewers see the advertisements. In particular, it is difficult or impossible to be paid a higher price if a higher-than-expected number of viewers see the advertisements. It is difficult or impossible to target advertising to particular demographics or geographic areas without setting up a one or more media servers for each demographic or geographic area and ensure that each viewer connects to the appropriate media server.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
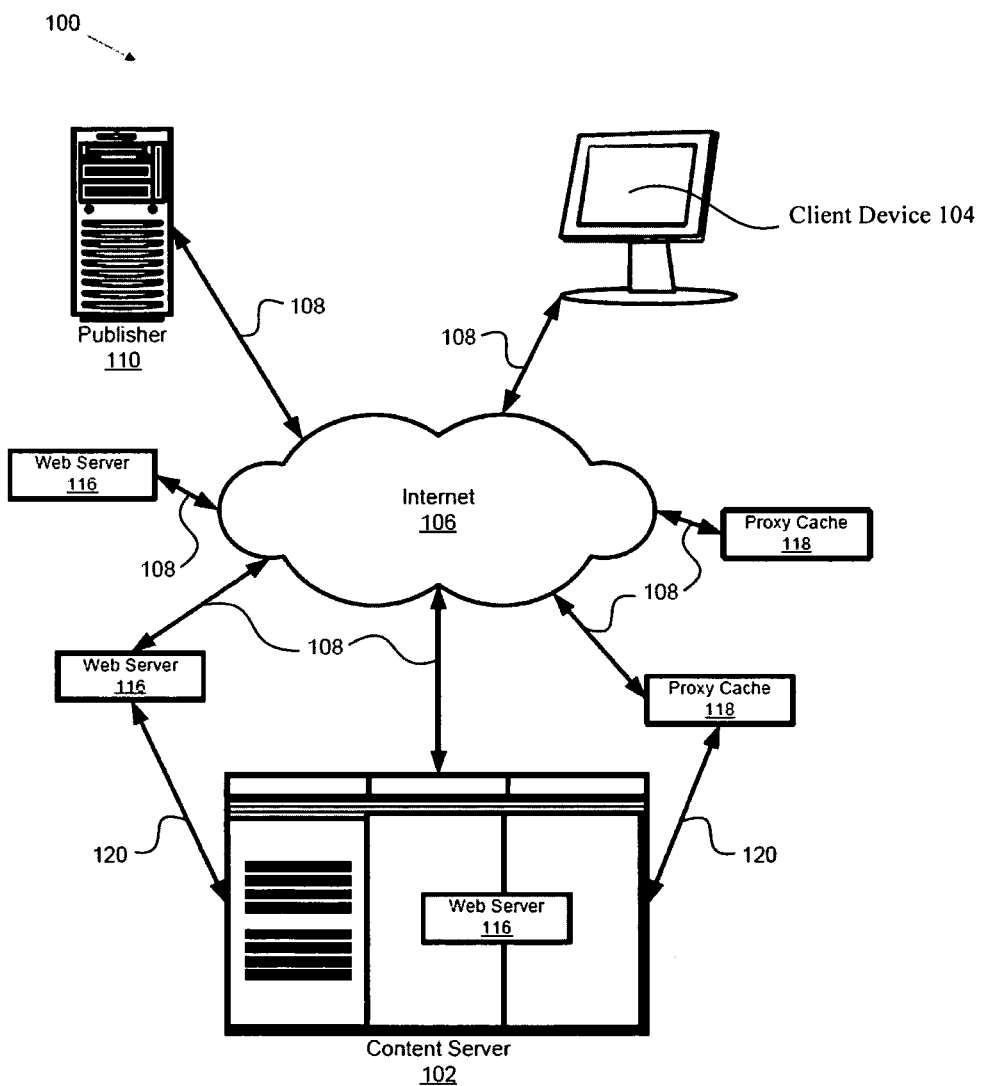
FIG. 1 is a schematic block diagram illustrating one embodiment of a computing environment in which a media player on a client device of the present embodiments may be employed.

The following description describes embodiments of managing advertisements for multimedia content for a live event delivered over the Internet. In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Many of the functional units described in this specification have been labeled as modules, engines, or managers, in order to more particularly emphasize their implementation independence. For example, a module may be implemented as a hardware circuit comprising custom integrated circuits or gate arrays, off-the-shelf semiconductors such as logic chips, transistors, or other discrete components. A module, engine, or manager may also be implemented in programmable hardware devices such as field programmable gate arrays, programmable array logic, programmable logic devices, or the like. These modules, engines, and managers may also be implemented in software for execution by various types of computing devices. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

There are at least two models for insertion of advertisements into live events, such as live Internet video. The first model, which has been described above, inserts advertising into the video stream of the live event at some point no later than the media server or the equivalent. The media server is a server that stores the video to be shared with one or more media players over the Internet. Since the advertisements are inserted no later than the media server, all viewers see the same advertisements at the same point in time in the live event, for example. In this model, the media player is not involved in selecting the advertisements for the advertisement breaks.

The embodiments described herein are directed at a second model for insertion of advertisements into multimedia content for live events (referred to herein as live multimedia content). It should be noted that the multimedia content is data that when processed by the media player allows the media player to present a visual and/or audio representation of the live event to a viewer (i.e., user of the media player). For example, the live event may be a television broadcast, such as of a sporting event, a live performance, a live news report, or the like. The live event may also have pre-recorded content intermingled with the live multimedia content, such as slow motion clips of important events within the live event (e.g., replays), which are played in between the live telecast. More importantly than the type of broadcast, the live event is scheduled to be played at a particular point in time. In the second model, each individual media player selects and inserts into the multimedia content one or more advertisements to fill one or more advertisement breaks in the live event. In this model, each viewer potential sees a different advertisement at the same location in the multimedia content. The viewers are human beings who watch or listen to the multimedia content using the media player. In one embodiment, the media player makes the decision of which advertisement(s) to play. In another embodiment, the advertisement decision making may be delegated to another entity. In either embodiment, the identity of the advertisement viewed at a particular point in the live event may differ from player to player. It should be noted that although some embodiments describe inserting advertisements into the video of a live event, in other embodiments, the media player may play other types of multimedia content than just video. For example, the media player may also play audio content of a live event.

Selecting advertisements by the media player, instead of inserting them into the video stream before the media server, is much more flexible. At the very least, it is possible to precisely control the number of advertisements impressions served. For example, an advertiser can buy 50,000 advertisements impressions and the broadcaster can serve exactly that many advertisement impressions. There is also the potential for the advertising to be more targeted based on the geographic location and/or demographics of individual viewers instead of the average demographic of the program, as done in television broadcasts.

FIG. 1 is a schematic block diagram illustrating one embodiment of a computing environment 100 in which a media player on a client device 104 of the present embodiments may be employed. The computing environment 100 includes a content server 102 (also referred to as a media server) and the client device 104. The content server 102 and the client device 104 may be coupled by a data communications network. The data communications network may include the Internet 106 and network connections 108 to the Internet 106. Alternatively, the content server 102 and the client device 104 may be located on a common Local Area Network (LAN), Personal area network (PAN), Campus Area Network (CAN), Metropolitan area network (MAN), Wide area network (WAN), wireless local area network, cellular network, virtual local area network, or the like. The client device 104 may be a client workstation, a server, a computer, a portable electronic device, an entertainment system configured to communicate over a network, such as a set-top box, a digital receiver, a digital television, or the like. For example, portable electronic devices may include, but are not limited to, cellular phones, portable gaming systems, portable computing devices, or the like. The client device 104 may have access to the Internet via a firewall, a router, or other packet switching devices.

In the depicted embodiment, the computing environment 100 also includes a publisher 110 (e.g., server or content repository), and one or more web servers 116. The publisher 110 may be a creator or distributor of multimedia content. For example, if the multimedia content to be streamed were a broadcast of a television program, the publisher 110 may be a television or cable network channel such as the ABC® channel, or the MTV® channel. Multimedia content from the publisher may be transferred over the Internet 106 to the content server 102, which may be configured to receive, process, and store multimedia content. In one embodiment, the multimedia content is accessed by the client device 104, which is configured to play the content on a media player. In one embodiment, the content server 102 delivers the multimedia content by streaming the multimedia content to the client device 104. Alternatively, other delivery methods may be used, such as, progressive downloading. In a further embodiment, the client device 104 is configured to receive different portions of the multimedia content from multiple locations simultaneously. For example, the client device 104 may request and receive content from any of the multiple web servers 116.

Multimedia content from the content server 102 may be replicated to other web servers 116 or alternatively to proxy cache servers 118. Replicating may occur by deliberate forwarding from the content server 102, or by a web, cache, or proxy server outside of the content server 102 asking for content on behalf of the client device 104. In a further embodiment, content may be forwarded directly to the web servers 116 or proxy cache 118 servers through direct communication channels 120 without the need to traverse the Internet 106.

In one embodiment, the publisher 110 stores the multimedia content in a content file to be distributed. The content file may include data corresponding to video and/or audio corresponding to a television broadcast, sporting event, movie, music, concert, or the like. The original content file may include uncompressed video and audio, or alternatively, uncompressed video or audio. Alternatively, the content file may include compressed content (e.g., video and/or audio) using standard or proprietary encoding schemes. The original content file from the publisher 110 may be digital in form and may include multimedia content having a high bit rate, such as, for example, 2 Mbps or greater.

The content server 102 may receive the content file from the publisher 110, and decompress the content file (if encoded) into raw audio and/or video. In one embodiment, the content server 102 segments the raw audio and/or video of the content file into multiple portions of the content. The portions may have an equal duration, or alternatively, the portions may have equal file sizes, or vary one to another according to other requirements. Each portion of the content may then be encoded into multiple encoded representation of the same portion of content. The multiple encoded representations may be encoded according to different video quality profiles and stored as separate files. Each of the files may be stored in a database, and may be separately requested and downloaded to the client device 104. In another embodiment, the content server 102 segments multimedia content that has already been encoded into portions.

In one embodiment, the content server 102 segments the multimedia content into portions of multimedia content, referred to herein as streamlets. The term "streamlet," as used herein, refers to a single encoded representation of a portion of the video. Each streamlet may be an individual file that includes a portion of the multimedia, and may be encapsulated as an independent media object, allowing the streamlet to be cached individually. In one embodiment, a streamlet is a static file that can be served by a non-specialized server, instead of a specialized media server. In one embodiment, the content in a streamlet may have a predetermined length of playback time. The predetermined length of time may be in the range of between about 0.1 and 5.0 seconds, for example. The content in the streamlet may have a unique time index in relation to the beginning of the content contained in the stream. Alternatively, the streamlets may be divided according to a file size, instead of a time index. The term "stream," as used herein, may refer to a collection of streamlets of the video encoded by the same video quality profile, for example, portions of the video that have been encoded at the same video bit rate. The streamlets may be stored as separate files on any one or more of the web servers 116, or the proxy caches 116. The separate files (e.g., streamlets) may be requested from the web server using Hypertext Transfer Protocol (HTTP). Using a standard protocol, such as HTTP, eliminates the need for network administrators to configure firewalls to recognize and pass through network traffic for a new, specialized protocol, such as Real Time Streaming Protocol (RTSP). Additionally, since the media player 200 initiates the request, the web server 116 is only required to retrieve and serve the requested streamlet, not the entire stream. The media player 200 may also retrieve streamlets from more than one web server 116. The web servers 116 may be without server-side intelligence to retrieve the requested portions. In another embodiment, the streamlets are stored as separate files on a cache server of a network infrastructure operator (e.g., an ISP), or other components of a content delivery network.

Although some of the present embodiments describe the use of streamlets, the embodiments described herein are not limited to use in computing systems that use streamlets, but may also be implemented in other systems that use other techniques for delivering live multimedia content over the Internet.

Figure 2:
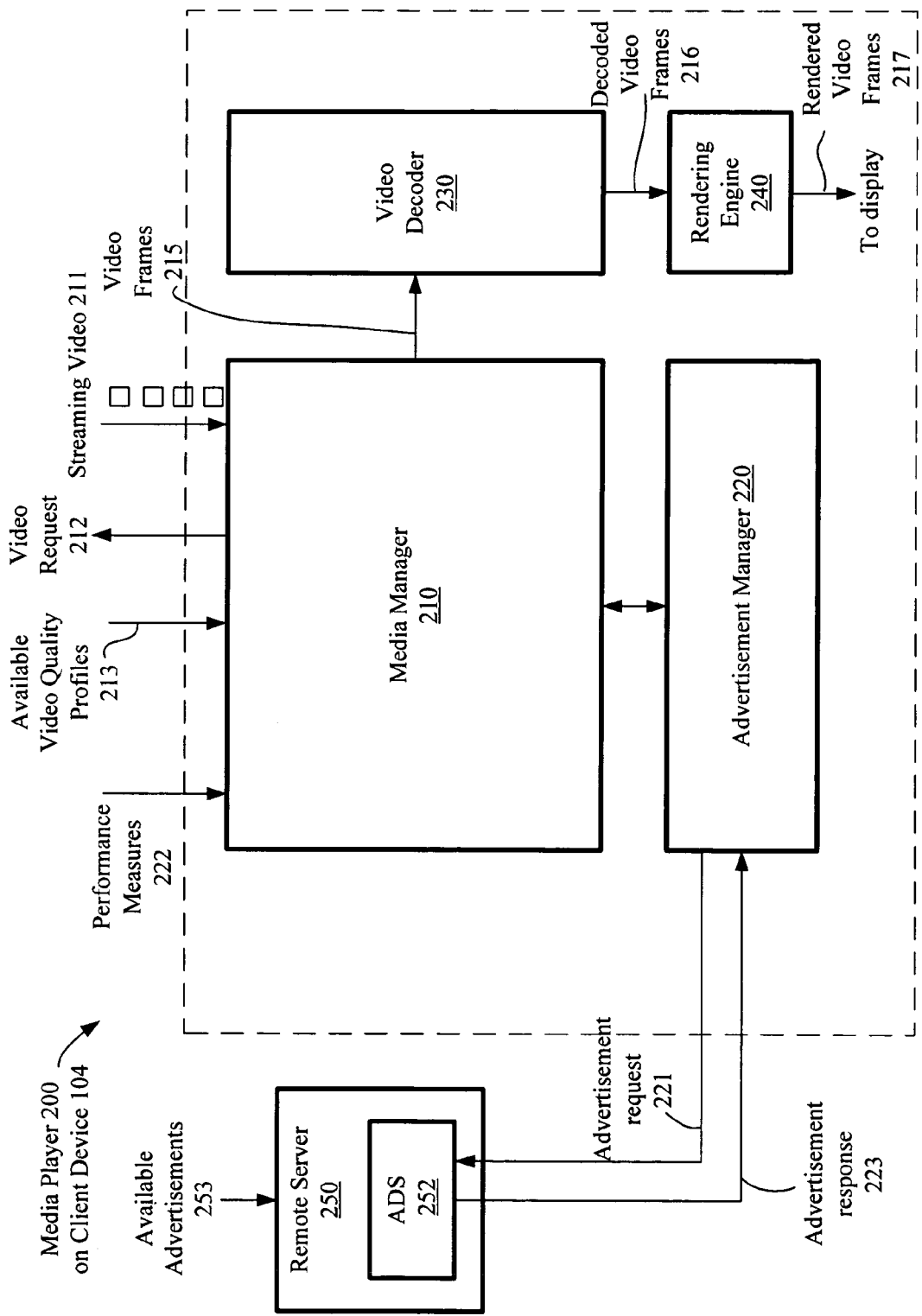
FIG. 2 is a schematic block diagram illustrating one embodiment of a media player on a client device, including an advertisement manager for managing advertisements for streaming video of a live event.

FIG. 2 is a schematic block diagram illustrating one embodiment of a media player 200 on the client device 104, including an advertisement manager 220 for managing advertisements for streaming multimedia content (e.g., Internet video) of a live event. The media player 200 includes a media manager 210, the advertisement manager 220, a video decoder 230, and a rendering engine 240. The media manager 210 is coupled to the advertisement manager 220 and the video decoder 230. The media manager 210 receives streaming video 211 and the available video quality profiles 213 associated with the streaming video 211 from the one of the web servers 116 (or proxy caches 118) over the network connection 108. The media manager 210 may receive the available video quality profiles 213 in a metadata file downloaded from the content server 102 over the network connection 108, or alternatively, from the publisher 110. The metadata file may describe an entire content file, such as with a virtual timeline that represents when the multimedia content and the intermittent advertisement breaks are to be sequentially played by the media player 200. The metadata file may include information, such as, for example, a start index, a duration, an end index, whether the content is live, proprietary publisher data, encryption level, content duration, bit rate values, including frame size, audio channel information, codecs used to encode the portions of the video, sample rates, and frame rate. The metadata file may include various parameters about the available video quality profiles 213 for the streaming video 211. The parameters for each of the available video quality profiles 213 may include the width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. The available video quality profiles 213 may also include a table indicating the file size of one or more portions (e.g., streamlets as described below) of the streaming video 211, such as the first portions of the requested video.

The media manager 210 may receive the streaming video 211 as a sequence of files (e.g., streamlets) for each of the time indexes, and then arrange the files according to the time indexes. In this embodiment, the media manager 210 sends video request 212 to request portions of the streaming video 211. The media manager 210 may request and receive the files sequentially in time according to the time indexes. Alternatively, the media manager 210 may receive the files in an order that is not sequential in time according to the time indexes. Alternatively, the media manager 210 receives one or more files concurrently. Although the media content may be segmented into sequential streamlets, and encoded into individual streamlets according to different video quality profiles, the streamlets may be separately requested and received.

The media manager 210 decides what streamlets to request based on any number of given constraints and/or preferences set by, for example, a viewer, the publisher, the web page designer, or constraints or preferences generated within the media player 200, for example, the media player 200 can decide what streamlets to request based on the network performance measures 222, computational load measures, staging size (e.g., viewing window), the maximum and/or minimum acceptable video quality profile, the available video quality profiles, or the like. The media manager 210 may also decide based on factors, including, for example, the optimal video quality profile, or the amount of video already available in the media manager 210. In one embodiment, the media manager 210 determines a performance factor of the network as described in U.S. Patent Application Publication No. 2005/0262257, filed Apr. 28, 2005. Alternatively, the media manager 210 can track network performance and generate network performance measures using other techniques that would be appreciated by those of ordinary skill in the art.

In one embodiment, the network performance measure 222 is a current bandwidth estimate. In another embodiment, the network performance measure 222 is indicative of the available bandwidth of one or more Transport Control Protocol (TCP) connections. In another embodiment, the performance measure 222 is indicative of a current read ahead margin. The current read ahead margin is a current amount of contiguous, sequentially arranged, un-played portions of the video for playback on the media player. In another embodiment, the network performance measure 222 is indicative of a minimum safety margin. The minimum safety margin is a desired amount of contiguously available sequentially arranged portions of video for playback on the media player. In another embodiment, the network performance measure 222 is indicative of latency of the requested portions. The latency is a time measure between when a request is issued and a time that response data of the requested portion begins to arrive at the client device 104. In another embodiment, the network performance measure 222 is indicative of time intervals between successive receive times for each response to the requested portions. In another embodiment, the network performance measure 222 is indicative of delays or losses in one or more of the TCP connections. In another embodiment, the network performance measure 222 is indicative of the number of bytes for a small interval of time, regardless to which streamlet the data belongs. Alternatively, other network performance measures may be used. The network performance measures 222 may be monitored and used by the media manager 210 in predictively selecting the predicted video quality profile for one or more subsequent streamlets. Alternatively, the media manager 210 may monitor and use the network performance measure 222 in deciding what video to request, decode, and render. In response, the media player 200 may periodically select the optimal video quality profile for requesting subsequent portions of the video. When played by the media player 200, the streaming video 211 may include streamlets that were encoded according to different video quality profiles.

In one embodiment, a user selects a link on a web page to request which video the user wishes to view. In response to selecting the video to stream, the web page may send a network address, such as a Uniform Resource Locator (URL), to the media manager 210. The network address identifies a location where the metadata file, including the available video quality profiles 213, is stored, and a location where the multimedia content can be retrieved. The media manager 210 retrieves the metadata file at the identified network address, and may store the metadata file in memory associated with the media manager 210. The media manager 210 may use the available video quality profiles 213 in predicting the optimal video quality profile for requesting subsequent portions of the video.

The media manager 210 may decide what portions of video to request in order to play the requested video based on certain criteria, and requests the streamlets accordingly. The media manager 210 then stages the downloaded streamlets into a sequence of streamlets in the order in which the streamlets should be decoded and rendered. In the depicted embodiment, the media manager 210 extracts the video frames 215 from the staged video portion and passes the video frames 215 to the video decoder 230.

The video decoder 230 decodes the video frames 215 and outputs the decoded video frames 216 to the rendering engine 240. In one embodiment, the video decoder 230 implements the TrueMotion VP7 codec, available from On2 Technologies®. Alternatively, other video decoders may be used. The rendering engine 240 renders the decoded video frames 216, and outputs the rendered video frames 217 to a display. The display may be a viewing window within a GUI, generated by the media player 200. Alternatively, the display may be a screen of the client device, such as a computer monitor, a television screen, or the like.

The media player 200 receives the multimedia content over the network connection for playback on the media player 200. During playback of the multimedia content, the media player 200 receives advertisement markers that indicates start times and scheduled durations for one or more advertisement breaks. The media player 200 selects one or more advertisements for playback to fill the scheduled durations of the advertisement breaks. In one embodiment, when advertising is inserted by the media player 200, one technique for advertisement selection is for the media player 200 to send a request 221 for an advertisement decision to an Advertisement Decision Service (ADS) 252, and receive in response 223 the identity of the advertisement to play. The ADS 252 is an external service, running on a remote server 250 accessible over the Internet. The ADS 252 selects the advertisement to play from an inventory of available advertisements 253 (e.g., advertisement impressions). The inventory may represent the advertisements which the publisher of the multimedia content has sold to advertising customers.

Rules in the ADS 252 may influence the selection of an advertisement from the inventory. The rules may take into account information supplied in the request 221 by the media player 200, such as the local time of player 200, keywords, the geographic location of the media player 200 (e.g., determined by the host's IP address), demographics of the viewer (user of the media player), and the like. These rules and others would be appreciated by one of ordinary skill in the art, and as such, additional description of these rules has not been included. In one embodiment, when the media player 200 requests the advertisement decision 221, the ADS 252 returns the identity of the advertisement 223 to be displayed to the requesting media player. Each individual media player may potentially receive a different advertisement response for the same advertisement opportunity (e.g., the scheduled advertisement break). After the advertisement is selected in this fashion, the media player 200 fetches and plays the advertisement. In one embodiment, the remote server 250 stores the available advertisements 253, and the media player 200 requests the selected advertisements before the advertisement break. In another embodiment, the media player 200 stores the available advertisements 253. Alternatively, the available advertisements 253 are stored and retrieved over the Internet from servers that are distinct from the media player computer and the ADS server 250. In one embodiment, the ADS 252 supports an interface that receives the duration of the advertisement break from the media player 200 and/or any targeted-advertisement information, and returns the identities of advertisement(s) that should be requested by the media player 200 to fill the advertisement break. In other cases, the media player 200 determines the number and durations of the one or more advertisements selected to fill the scheduled advertisement break, and makes individual requests for the one or more advertisements of the appropriate durations from the ADS 252, or elsewhere. Alternatively, other techniques for advertisement selection could be implemented, for example, the ADS 252 may be implemented within the media player 200, or within the content server 102. Alternatively, the selection of advertisements may be done using other techniques than using the ADS 252. The details of how advertisements could otherwise be selected to fill an advertisement break would be appreciated by one of ordinary skill in the art, and accordingly, a detailed description of such has not been provided. It should be noted that the embodiments of FIG. 2 describe advertisement insertion into streaming video. Alternatively, advertisement insertion may be performed by the media player 200 that is configured to receive the live multimedia content using other delivery methods than streaming.

Figure 3A:
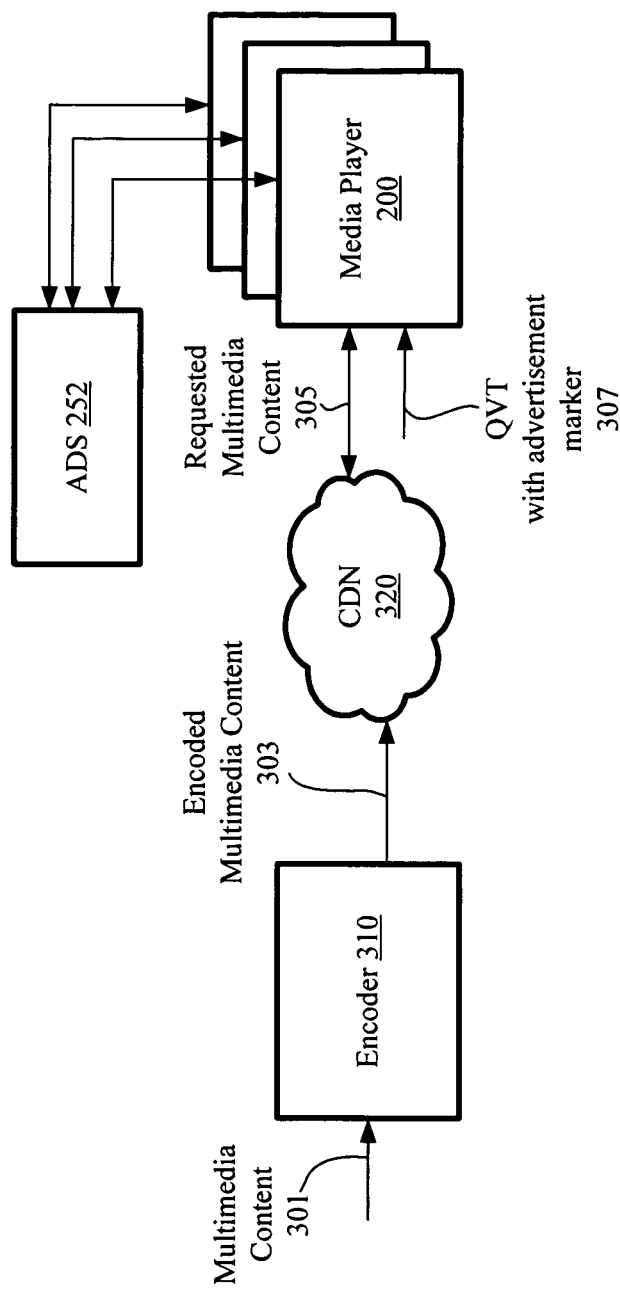
FIG. 3A is a schematic block diagram illustrating another embodiment of a computing environment in which the media player of FIG. 2 may be employed.

FIG. 3A is a schematic block diagram illustrating another embodiment of a computing environment in which the media player of FIG. 2 may be employed. In this embodiment, an encoder 310 receives the multimedia content of a live event 301. The encoder 310 may receive the multimedia content as one or more content files from a publisher (e.g., server or content repository). Alternatively, the encoder 310 receives a direct feed of the live television broadcast, such as a captured broadcast. The multimedia content may be captured by a capture card, configured for television and/or video capture, such as, for example, the DRC-2600 capture card, available from Digital Rapids of Ontario, Canada. Alternatively, any capture card capable of capturing audio and video may be utilized with the present invention. The capture card may be located on the same server as the encoder, or alternatively, on a separate server. The content file(s) may be transferred from the publisher to the encoder 310 over the Internet. The content files may be transferred from the publisher in a compressed state, and then converted into raw audio and/or video before encoding. Alternatively, the encoder 310 receives the multimedia content 301 as it is captured. The encoder 310 may utilize encoding schemes such as DivX® codec, Windows Media Video 9® series codec, Sorenson Video® 3 video codec, TrueMotion VP7 codec from On2 Technologies®, MPEG-4 video codecs, H.263 video codec, RealVideo 10 codec, OGG Vorbis, MP3, or the like. Alternatively, a custom encoding scheme may be employed.

The encoder 310 provides the encoded multimedia content 303 to a content delivery network (CDN) 320. The CDN 320 is a system of computers networked together across the Internet that cooperate transparently to deliver content. The CDN 320 may include a content management system (CMS) that manages the multimedia content, for example, using a database, and allows a publisher to generate virtual timelines to schedule the playback of the live multimedia content. The CDN 320 stores and delivers the encoded multimedia content 303 that has been encoded by the encoder 310. In particular, the media player 200 requests and receives the multimedia content 305 of the live event from the CDN 320. The CDN 320 may be used for the purpose of improving performance, scalability, and cost efficiency to the end users (e.g., viewers) by reducing bandwidth costs and increasing global availability of content. CDNs may be implemented in various manners, and the details regarding their operation would be appreciated by one of ordinary skill in the art. As such, additional details regarding their operation have not been included.

In one embodiment, the encoder 310 segments the content files of the multimedia content 301 into multiple streamlets according to multiple video quality profiles. These streamlets of different qualities may have the same duration (e.g., same time index), for example. As illustrated in FIG. 3A, one or more media players 200 can request and receive content 305 from the CDN 320. The media players 200 may individually request different qualities of the same multimedia content 305, for example, by requesting streamlets of different qualities having the same time index. For example, one media player may request a streamlet having HD quality video, since the computing device of the requesting media player has sufficient computational load and sufficient network bandwidth, while another media player may request a streamlet having a lower quality, since its computing device may not have sufficient network bandwidth, for example.

The media players 200 receive the requested multimedia content over the network connection for playback on the media player. During playback of the multimedia content, the media player 200 receives advertisement markers that indicate start times and scheduled durations of the advertisement breaks. In one embodiment, the media player 200 receives metadata having a virtual timeline (QVT) 307. The QVT 307 defines a playlist for the viewer. The QVT 307 may represent a day, a week, a month, etc. worth of programming, or alternatively, may represent just the requested program. For example, the QVT 307 may indicate the schedule of the live event, such as designated when to start playing certain portions of the multimedia content using the media player 200, and when to stop playing the multimedia content for advertisement breaks, which are filled by one or more advertisements selected by the media player 200. The QVT 307 may also be intermingled with live and non-live content. In one embodiment, a content management system (CMS), which may be part of a publishing system, can be used to manage the multimedia content, for example, using a database that stores the available multimedia content. The CMS may allow a publisher to generate virtual timelines (e.g., QVT 307) to schedule the playback of the live multimedia content.

The QVT 307 includes one or more advertisement markers. Each advertisement marker indicates the start time of the advertisement break, as well as the scheduled duration of the advertisement break. The QVT 307 allows the publisher to define a broadcast schedule in a manner similar to a television station. The media player 200 can anchor, or otherwise associate the start of the QVT 307 with an actual point in time, such that upon playback, the media player 200 can start playback of the multimedia content at a position that reflects "live" in the timeline. For example, the QVT 307 could be anchored to 10:00 am, MDT on Jan. 1, 2009. If at 10:15 am, a viewer begins the timeline, the media player could determine that 15 minutes has already elapsed since the anchor point of the timeline, so playback would begin 15 minutes into the timeline for this particular viewer. This arrangement simulates normal television viewing, where a person turns on the TV and views whatever content is now playing, and two viewers in different locations viewing the same channel see the same show, even if one of them has been watching for several hours and the other has just turned on the TV. Alternatively, playback could commence at the beginning of the program (start of the timeline) and a viewer would effectively be 15 minutes behind live. In one embodiment, the media player 200 is configured to anchor, or otherwise associate the QVT 307 with a time relative to the local time zone of the media player 200. For example, the QVT 307 may be associated with the start of the day in the local time zone of the media player 200. Accordingly, a publisher could advertise a certain event starting at 6:00 pm, and regardless of the local time zone of the media player, the event would appear to start at 6:00 pm. In one embodiment, the QVT 307 may be marked to be periodically updated, indicating to the media player 200 that the media player 200 is to periodically check for an updated QVT, for example, every 5 seconds. The publisher can dynamically alter the scheduled playout of the multimedia content and advertisements without interrupting playback. The updated QVT may also be used to designate upcoming advertisement breaks, or to dynamically schedule advertisement breaks.

In one embodiment, the media player 200 requests (e.g., pulls) the QVT 307. Alternatively, the QVT 307 may be pushed to the media player 200. The QVT 307 may be received through the CDN 320, or alternatively, through other means outside of the CDN 320. The media player 200 may also receive other types of metadata, including, but not limited to, air date of the content, title, actresses, actors, a start index, an end index, proprietary publisher data, encryption level, content duration, episode or program name, publisher, available tools for the end-user navigational environment, such as available menus, thumbnails, sidebars, advertising, fast-forward, rewind, pause, and play, or the like, or bit-rate values, including frame size, audio channel information, codecs, sample rate, and frame parser information.

The media players 200 individually select one or more advertisements for playback to fill the scheduled duration of the advertisement breaks, as designated by the received advertisement markers. Since the media players 200 individually select the advertisements to fill the advertisement breaks, the media players 200 may play back different advertisements than one another, as well as different advertisements than the original broadcast. The advertisement insertion by the media player 200 is transparent to the viewer, and may allow directed or targeted advertisement. The directed advertisements may be dynamically selected by the media player 200 based upon various factors, including, but not limited to, the geo-location of the media player, the website the event is being viewed on, the user profile, browsing history of the viewer, buying history of the viewer, time, date, demographic information of the viewer, interest or preferences of the viewer, or the like. In one embodiment, the advertisements breaks are scheduled advertisement breaks at predetermined points in time relative to the beginning of the live event. The one or more advertisements may be multimedia advertisements, such as pre-recorded video advertisements, pre-recorded audio advertisements, or even a static image to be displayed during at least a portion of the advertisement break. Alternatively, other types of advertisements may be used to fill the advertisement breaks.

The media player 200 manages the playout of selected advertisements in the multimedia content of live events, such as live Internet video. In one embodiment, the multiple media players 200 (e.g., advertisement manager 220) adjust the scheduled duration of an advertisement break, on a player-by-player basis, to an effective advertisement break duration.

The embodiments described herein of live Internet video advertisement insertion differs from live broadcast television advertisement insertion or Internet-based VOD advertisement insertion. There are unique challenges in live Internet video that require solutions distinct from those used in the other contexts. One interesting challenge is managing the conflict between the variability of playout of advertisements in an advertisement break in Internet video on the one hand and the need for precision in the duration of advertisement breaks in a live event on the other hand.

Figure 3B:
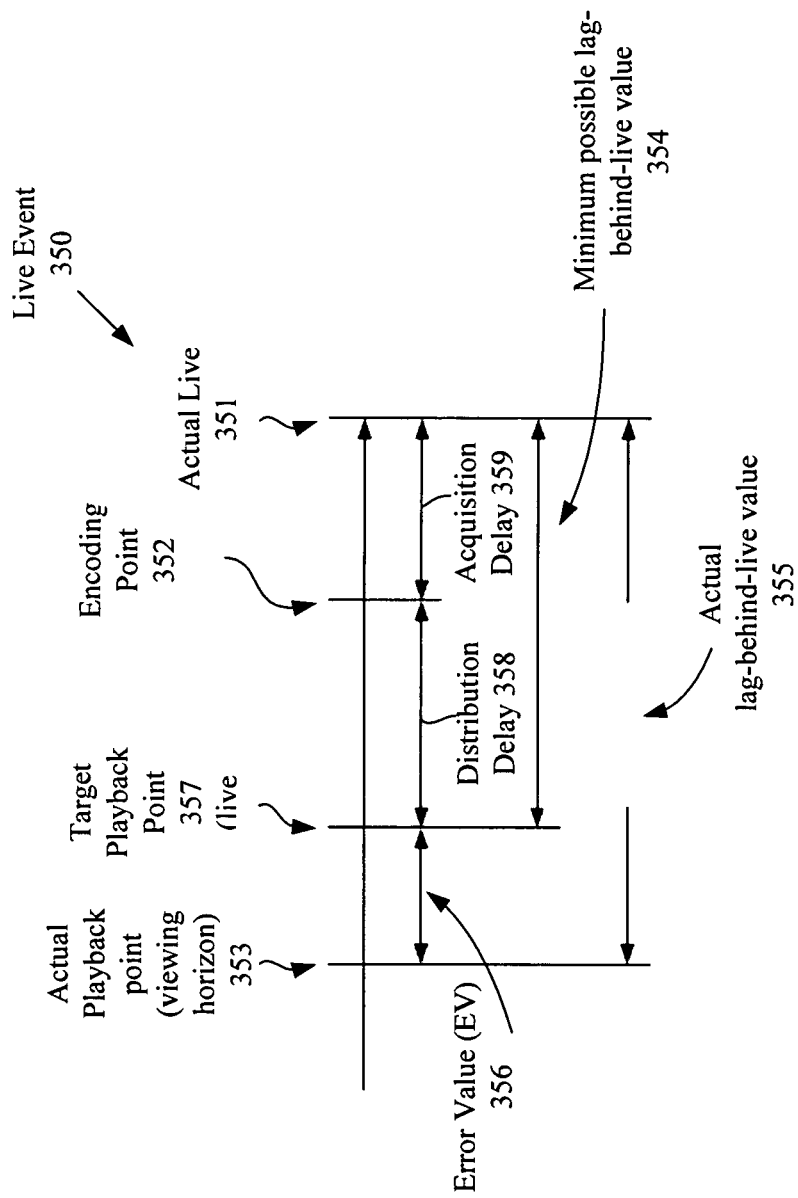
FIG. 3B is a graphical representation of different points in time of a live event according to one embodiment.

FIG. 3B is a graphical representation of different points in time of a live event according to one embodiment. For a particular live event 350 delivered over the Internet by a particular technology, there is a minimum possible lag behind live (e.g., minimum possible lag-behind-live value, X, 354). The minimum possible lag-behind-live value 354 may be zero to several minutes depending on the equipment of the system and the system's settings. The minimum possible lag-behind-live value 354 accounts for delays caused by acquisition and distribution of the multimedia content of the live event, designated as distribution delay 358 and acquisition delay 359. The minimum possible lag-behind-live value 354 may be fixed for a particular live event. The actual lag-behind-live value 355 is the difference in time between a particular point in time in the live event 351 (e.g., actual live) and an actual playback point 353 of when a portion of the multimedia content corresponding to the particular point in time is played back on the media player 200. The actual playback point 353 is sometimes referred to as the viewing horizon, whereas the target playback point 357 is sometimes referred to as the live horizon. In one embodiment, the minimum possible lag-behind-live value 354 is the difference in time between the particular point in time in the live event 351 (e.g., actual live) and when the portion of the multimedia content is available to the media player via Internet distribution. In another embodiment, the minimum possible lag-behind-live value 354 is the difference in time between the particular point in time in the live event 351 and when the portion of the multimedia content has been encoded, also referred to as the encoding point 352. In one embodiment, an error value 356 is measured as the difference between the actual lag-behind-live value 355 and the minimum possible lag-behind-live value 354. For example, a viewer watching a live event with a minimum lag-behind-live of one minute should ideally be watching action that began to be recorded and processed one minute before, assuming an error value 356 of zero. Alternatively, other technologies for live Internet video may have lower or greater minimum possible lag-behind-live values, but the same challenges apply in reducing the error value 356 to be as close to zero as possible. Focusing on the error value 356 rather than the actual lag-behind-live value 355 simplifies the discussion. It should be noted that that the error value 356 is non-negative, and can conceivably be zero, but since the actual lag-behind-live value 355 can, by definition, never be less than the minimum possible lag-behind-live value 354, the error value 356 can never be less than zero. It should also be noted that although the viewers may be able to pause or to rewind the video while watching a live event, in such cases, the error value 356 can be calculated, but may be considered meaningless, since the viewer is aware that they are no longer attempting to watch the live event as it happens.

In one embodiment, during a live Internet video event, when a particular advertisement break ends, ideally the viewer should start seeing the live program content with a very low error value 356 (the difference between the current lag behind live for a particular viewer and the minimum lag behind live). For many publishers of live Internet video, minimizing the actual lag-behind-live value 355 is an important component of providing a good viewer experience. However, since the minimum possible lag-behind-live value 354 for a particular technology is generally fixed for a particular event, only the error component (e.g., error value 356) of the lag behind live may be subject to optimization.

Unlike conventional broadcast television, the media players 200 can dynamically select one or more advertisements shortly before the advertisements are to be played. Unlike the publisher of conventional broadcast television, an Internet video publisher cannot ensure that advertisement decisions are made in a timely fashion, that advertisements can be fetched in time to begin playing at the desired time, or that advertisements can play to completion without interruption once begun. Since, in some cases, the decision about which advertisements to be played is made outside the media player 200, such as by the ADS 252, the communication between the remote ADS 252 may be subject to the current state of the Internet and the network performance of the network connection of the media player 200. Also, although the media player 200 may be software supplied by the Internet publisher, the publisher is neither in control of the viewer's selection of computer, nor the other software that might be running on the computer, which may be competing with the media player for processing cycles. Also, the publisher is not in control of the viewer's selection of web browser or browser version. In addition, the advertisements may be obtained over the Internet from servers that are distinct from the client device 104 and the ADS server 250, and which may not be under the operational control of the Internet video publisher. Thus, there are many aspects of the process of selecting advertising and coordinating the insertion of advertising into the playout of regular live event program content over which the Internet video publisher may not have full control. Therefore, the Internet video publisher cannot ensure that advertisement decisions are made in a timely fashion, that advertisements can be fetched in time to begin playing at the desired time, or that advertisements can play to completion without interruption once the advertisement has started. Thus, it is possible for a viewer to end up further behind live (higher actual lag-behind-live value 355) after an advertisement break than he or she was before the advertisement break, which may be undesirable from the point of view of the live Internet video publisher. The embodiments described herein are directed at managing advertising of live events to ensure that the advertisement decisions are made in a timely fashion, that advertisements can be fetched in time to begin playing at the desired time, or that the advertisements can play to completion without interruption once the advertisement has started.

Unlike conventional VOD advertisement insertion, the embodiments described herein regarding insertion of advertisements into a live Internet video event should satisfy constraints, such as, for example, matching the effective duration of the advertisement breaks to the scheduled duration of the advertisement breaks. Thus, algorithms and solutions for advertisement insertion that work in an Internet VOD context may not be appropriate in a live Internet video context, even though they both apply to playout of video over the Internet. This is true even when the same encoding, distribution, and player technologies are used.

In the case of live Internet video, a particular advertisement break occupies a fixed portion of the live event in one embodiment. Typically, the source content of a live Internet video event is a broadcast television event, and the advertisement breaks available to the live Internet video event are simply the advertisement breaks of the source broadcast television event. The location and duration of these advertisement breaks are fixed and do not vary according to the performance of one or more media players. In some cases, the originally-scheduled advertisements are simply played as part of the live Internet video event. In this case, there is no need for Internet advertisement insertion. However, there is frequently a need to replace the original scheduled broadcast advertisements with Internet advertisements because of broadcast rights, improved ability for the publisher to charge for advertisement delivery, or the like. It should be noted that if the live event is being viewed on the Internet only, there may not be original advertisements to replace. However, there is still the concept of an advertisement break that the advertisements must occupy.

When advertisements are inserted into an advertisement break in a live Internet video event, it is important that the inserted advertisements (effective advertisement break), as played by the media player 200, occupy approximately the same amount of time as the scheduled advertisement break that they fill. If the advertisement break on the player ends too soon, the content following the advertisement break is not yet available to be viewed. If the advertisement break goes on too long, then when the regular program resumes, either the error value 356 is greater at the end of the advertisement break than at the beginning, or else some of the program content immediately following the advertisement break must be skipped in order to minimize the error value 356.

Figure 4:
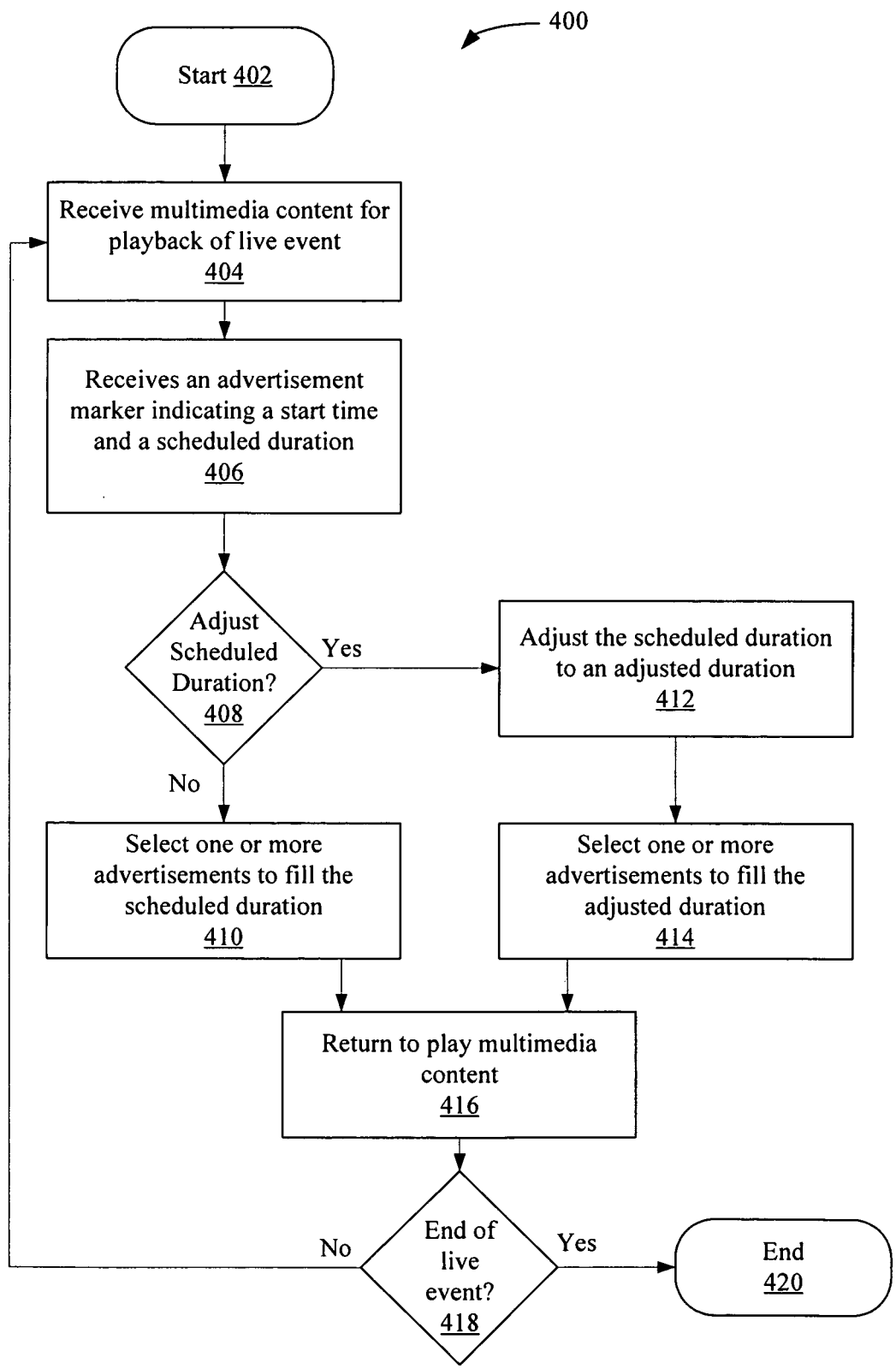
FIG. 4 is a flow diagram of one embodiment of a method of managing advertisements for a live multimedia event.

FIG. 4 is a flow diagram of one embodiment of a method of managing advertisements for a live multimedia event. The method 400 is performed by processing logic that may include hardware (circuitry, dedicated logic, or the like), software (such as is run on a general purpose computer system or a dedicated machine), or a combination of both. In one embodiment, method 400 is performed by the media player 200 of FIGS. 2 and 3A. In another embodiment, the method 400 is performed by the advertisement manager 220 of FIG. 2.

Processing logic starts (block 402) by receiving multimedia content for playback on the media player 200 (block 404). The multimedia content may be requested by the media player and may be received as a stream of the multimedia content, such as from a dedicated media server. Alternatively, the media content may be received as requested streamlets of different qualities, such as from the CDN 320 of FIG. 3A. During playback of the multimedia content, processing logic receives an advertisement marker indicating a start time and a scheduled duration of an advertisement break (block 406). In one embodiment, the processing logic receives metadata containing the advertisement marker, such as the QVT 307 of FIG. 3A. The processing logic may receive an initial QVT file that includes one or more scheduled advertisement breaks, including the starting times and durations. Alternatively, the processing logic may periodically receive QVT files that include dynamically-scheduled advertisement breaks, such as for advertisement breaks of a sporting event.

At decision block 408, processing logic determines whether the scheduled duration of the advertisement break needs to be adjusted. If not, the processing logic selects one or more advertisements to fill the scheduled duration (block 410). If the processing logic determines to adjust the scheduled duration, the processing logic adjusts the scheduled duration to an adjusted duration (block 412), and selects one or more advertisements to file the adjusted duration (block 414), instead of the scheduled duration. Various embodiments of how the scheduled duration is adjusted are described below. After either blocks 410 and 414, the processing logic returns to play the multimedia content after the advertisement break (block 416). At decision block 418, processing logic determines if the multimedia content is at the end of the live event. If so, the method ends (block 420), or otherwise, returns to block 404 to receive multimedia content for playback of the live event.

In one embodiment, processing logic adjusts the scheduled duration to an adjusted duration that is one of multiple standard durations of available advertisements, for example, 10, 15, 30, 45, 60, 75, 90 seconds, or the like. In one embodiment, the multiple standard durations are multiples of a specified constant that is the shortest standard-advertisement duration, for example, 15, 30, 45, 60 seconds, or the like. The specified constant may also be referred to as the constant rounding value. Using multiples of the specified constant, the advertisement breaks are multiples of the shortest advertisement duration; in this case, 15 seconds. Alternatively, other specified constants may be used. The standard durations can be used to more easily fill the advertisement breaks with standard-duration advertisements.

In one embodiment, processing logic adjusts a scheduled duration to an adjusted duration as a function of the scheduled duration and a first error value indicative of the media player's lag behind live. The first error value (e.g., 356) may be the difference in time between when a portion of the multimedia content is available to the media player 200 via Internet distribution and when a portion is played back on the media player. The first error value may be determined by determining the actual lag-behind-live value 355, and a minimum possible lag-behind-live value 354. Alternatively, the error value may be determined in other ways that would be appreciated by one of ordinary skill in the art. The error value may be determined before the start time of the scheduled advertisement break, such as at or near the beginning of the scheduled advertisement break.

In one embodiment, after a first error value has been determined, the processing logic receives a second advertisement marker that indicates a second start time and a second scheduled duration of a second advertisement break. The processing logic selects one or more advertisements for playback to fill the second adjusted duration of the second advertisement break, instead of the second scheduled duration. In one embodiment, the processing logic adjusts the second scheduled duration to the second adjusted duration as a function of the second scheduled duration and the first error value. In another embodiment, the processing logic adjusts the second scheduled duration as a function of the second scheduled duration, the first error value, and an additional fixed value. In one embodiment, the fixed value is a predefined minimum advertisement break duration. The fixed value may be used to accommodate other components of the system that may require a minimum duration. Alternatively, instead of adjusting the duration to one of the standard durations that are multiples of a specified constant, the fixed value may be added based on a multiple. For example, this fixed value may always be added, or alternatively, only added when the calculated duration is below the duration of the fixed value. In one embodiment, the fixed value is the duration of the shortest standard advertisement break (e.g., 15 seconds). Alternatively, other fixed values may be used.

In one embodiment, the processing logic adjusts the second scheduled duration by subtracting the first error value from the second scheduled duration to obtain a first value, and rounding the first value up to a second value that is a multiple of a specified constant, the second value being the second adjusted duration. In one embodiment, the specified constant is the shortest duration of the durations of available advertisements (e.g., 253) for playback on the client device. The standard-advertisement durations of the available advertisements may be multiples of the specified constant, for example, 15, 30, and 60 seconds. In this embodiment, the specified constant should be chosen to be the length of the shortest advertisement, which is 15 seconds. For example, when joining a program during an advertisement break with 4 seconds remaining, the duration of the advertisement break would be rounded up to 15 seconds. Scheduling a standard-sized advertisement of 15 seconds would occupy the remaining time (4 seconds) for which there is no multimedia content to play, and would increase the error value by only 11 seconds. Alternatively, the specified constant may be other values, such as is the greatest common factor of the durations of the available advertisements, or the least common multiple of the durations of the available advertisements.

In another embodiment, the processing logic adjusts the second scheduled duration by skipping an individual advertisement of the one or more advertisements selected during the second advertisement break. In another embodiment, the processing logic adjusts the second scheduled duration by replacing an advertisement of the one or more advertisements, having a first duration, with another advertisement of a second duration that is different from the first duration. In one embodiment, some or all of these operations may be performed by the advertisement manager 220 of FIG. 2. Alternatively, these may be performed by the media player 200 of FIG. 3A.

The following factors can be used by processing logic of the advertisement manager 220 or the media player 200 in determining whether to adjust the scheduled duration for implementing the various embodiments of managing advertisements in the multimedia content for live events: 1) After an advertisement break, the viewer's lag behind live should be as small as possible, that is, the error value 356 should be as small as possible, since the lag behind live cannot be less than the minimum supported by the technology (i.e., minimum possible lag-behind-live value 354); 2) The duration of the effective advertisement break (as seen by the viewer in the player, as opposed to the duration of the originally-scheduled advertisement break) should be such that the effective advertisement break ends no sooner than the originally-scheduled advertisement break would have, because the live event program content will not become available again for viewing until after the duration of the originally-scheduled advertisement break; for example, if the first advertisement break is extended, then the second advertisement break can be shorter than the originally-scheduled advertisement break, provided that it ends no sooner than the original second advertisement break would have ended; 3) Once begun, an advertisement should not be terminated early, since truncation of advertisements once begun is disconcerting to the viewer and may reduce advertising revenue; 4) As many standard-duration advertisements as possible should be played during the course of the live event in order to maximize advertising revenue; 5) The fact that advertisements may not always start at the desired time and may not play without stalling can be taken into account; 6) The viewer should not miss any of the multimedia content of the original program that immediately follows an advertisement break, even if the advertisement break, as executed by the player occupies more time than the original advertisement break. That is, after the advertisement break ends, no matter how much time it occupied, the viewer should see the original program content immediately following the advertisement break, even if this increases the error value 356. 7) Advertisement decisions should be made enough in advance that the identity of the advertisement is known and the advertisement can be queued up ready to play when the time for it arrives. Otherwise, the time required to perform these functions will affect the duration of the advertisement break. For example, assume there are 15 seconds remaining in the advertisement break and no advertisement has been selected to play to occupy this time. At this point, making an advertisement request, receiving the response, fetching enough of the advertisement to begin playing, and the process of starting play, all add up to a non-zero amount of time, so by the time the advertisement actually starts playing, less than 15 seconds remain. By the time the playout of an advertisement should begin, it is generally too late to make the decision about which advertisement to play.

To some extent these factors are in conflict. For example, the need to keep the error value 356 as small as possible may be in conflict with the desire to prevent advertisements from being truncated, since if there are pauses after an advertisement starts playing, playing the advertisement to completion may increase the error value 356. In another example, assume that an advertisement decision is requested and received for a 30-second advertisement during the playout of another advertisement. If there are pauses in the playout of the first advertisement after the advertisement decision for the following advertisement is made, there may be less than 30 seconds remaining in the advertisement break when the time to play the second advertisement arrives. At this point, it would be convenient to request another advertisement decision for an advertisement of shorter duration, but there may not be enough time left to make the advertisement decision. In another example, maximizing the number of advertisements played may increase revenue, but it may also increase the error value 356. These examples illustrate that it may not be possible to maximize every possible factor. Rather, what is needed is an approach that makes good tradeoffs and results in reasonable behavior as determined by any of the factors. For example, some publishers of live Internet video may make different tradeoffs than others.

The embodiments described herein are directed to managing the playout of advertisements, selected by the media player to be inserted into the multimedia content of the live event (e.g., live Internet video), and can make good tradeoffs among the factors described above. In most cases, advertisement break durations are adjusted to meet the selected goals of the publisher. The embodiments described herein can adjust the scheduled duration of an advertisement break, on a player-by-player basis, to match an effective duration with the scheduled duration of the advertisement break. The duration of a particular advertisement break may be adjusted, for example, to a smaller value to reduce the error value, or to a larger value to accommodate an additional standard-duration advertisement. The embodiments described herein may be adaptive in the sense that advertisement break durations are modified to adapt to current conditions, including the error value, the durations of the available advertisements, or the like. Since the Internet video publisher cannot control all aspects of the delivery of the content to the media player, which may result in delays in serving advertisements, the embodiments can adapt the scheduled durations of the advertisements to compensate for the delays. Also, the embodiments described herein adapt the duration of the advertisement breaks to deal with variations in the performance on the network, the media player, the servers delivering the advertisements, and the like.

Figure 5A:
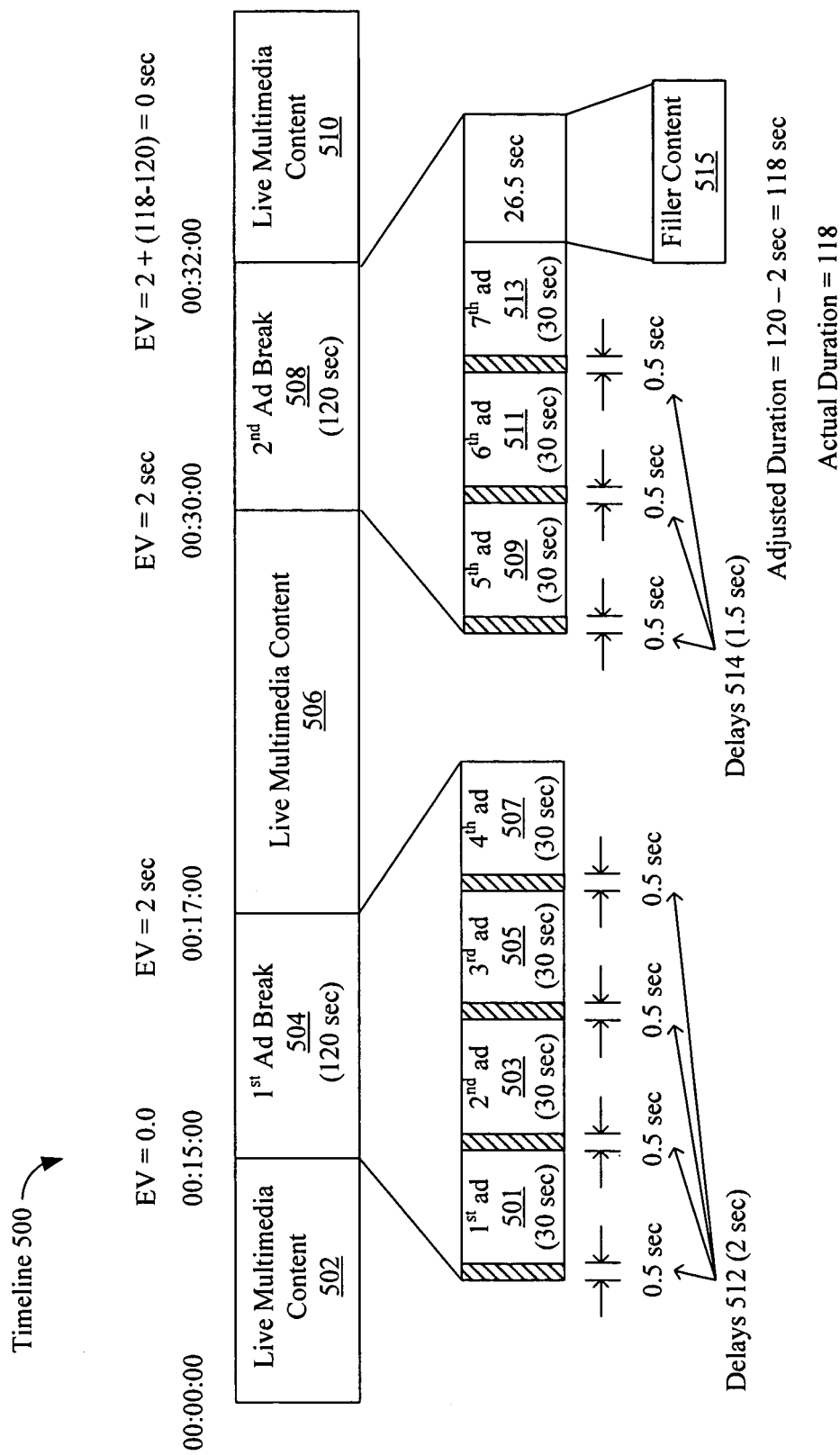
FIGS. 5A-5C illustrates graphical representations of timelines of live multimedia events with advertisement breaks according to various embodiments.
Figure 5B:
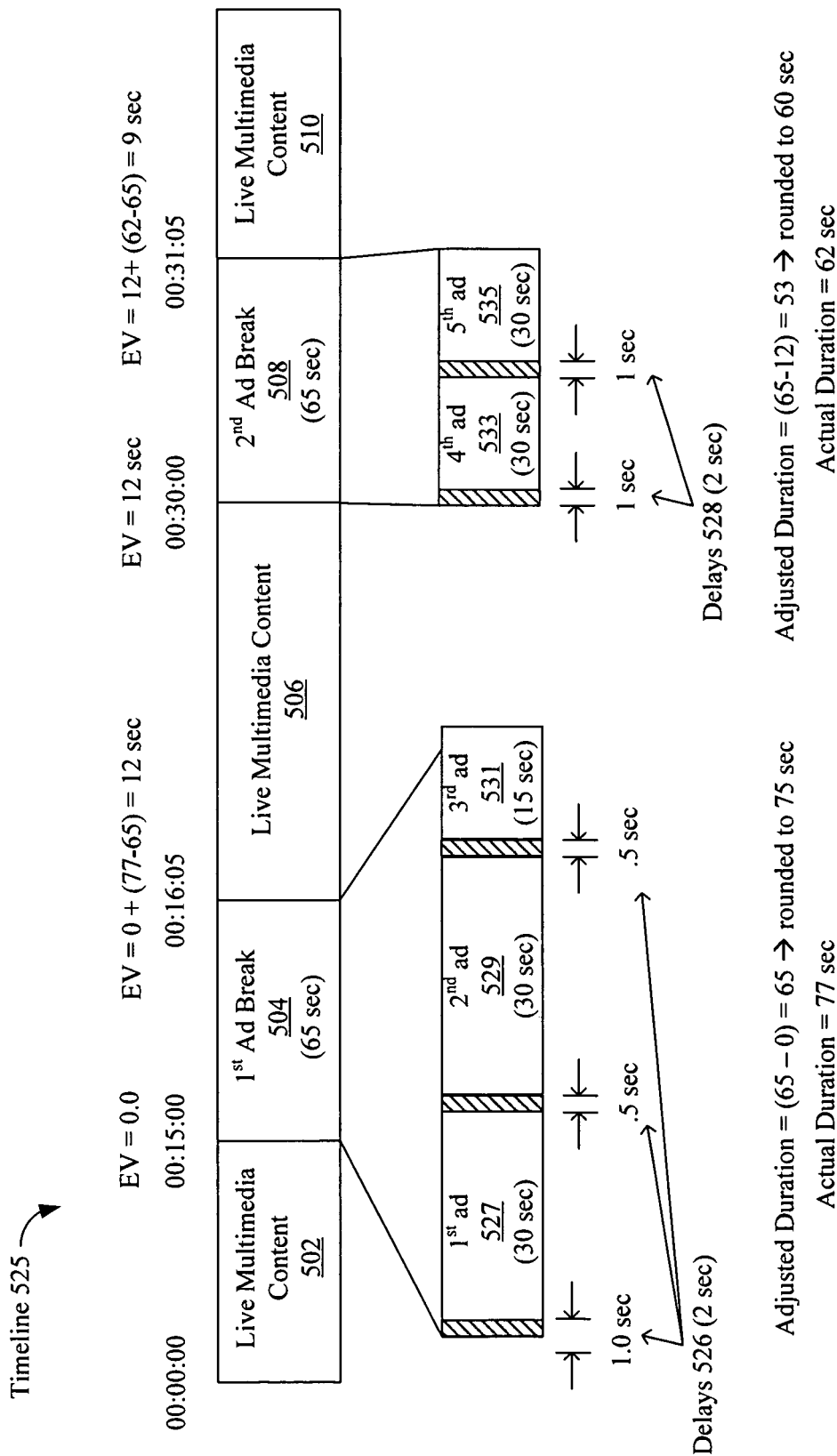
Figure 5C:
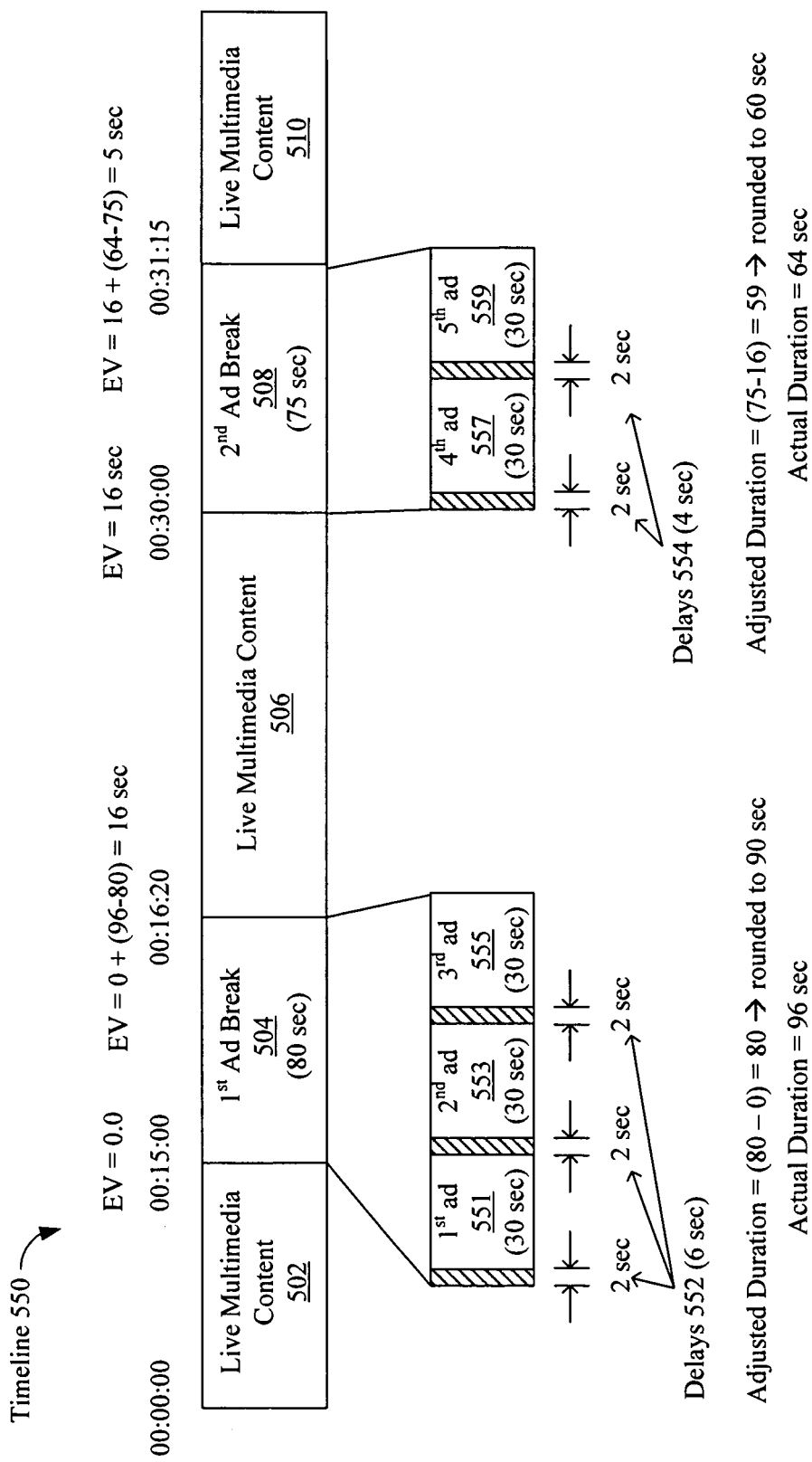

FIGS. 5A-5C illustrates graphical representations of timelines of live multimedia events with advertisement breaks according to various embodiments. The timeline 500 of FIG. 5A includes live multimedia content 502 that is scheduled to be played at time 00:00:00 by the media player 200. The timeline 500 also includes an advertisement marker for the first advertisement break 502, which is scheduled to start at time 00:15:00 and last for 120 seconds. One way to adapt the duration of the scheduled advertisement break is to deduct the value of the error value from the scheduled duration of the scheduled advertisement before it begins. In the depicted embodiment, the first two advertisement breaks 504 and 508 are both scheduled to be 120 seconds long. At the beginning of the first advertisement break 504, the error value is assumed to be zero. The first advertisement break 504 is broken up into four 30-second advertisements 501-507. There are some delays 512 associated with the first advertisement break 504, due to delays in fetching and beginning the playout of each of the selected advertisements 501-507 (0.5 second delay shown as the crosshatched areas in FIG. 5A). After all four advertisements 501-507 have been played by the media player 200, the delay 512 is two seconds. Thus, the error value has increased by two seconds during the advertisement break. The media player 200 returns to play the live multimedia content 506. Before the second advertisement break 508 begins, the error value of two seconds is subtracted from the scheduled duration, yielding an adjusted duration of 118 seconds. The adjustment to the scheduled duration can be represented by the following equation (1).

$$\text{adjusted\_duration} = (\text{scheduled\_duration} - \text{current\_error\_value}) \quad (1)$$

At the beginning of the second advertisement break 508, the error value has effectively been reduced to zero again. The new error value can be calculated according to the following equation (2), where the term "effective" is the effective duration or actual duration of the advertisement break, and the term "scheduled" is the originally-scheduled duration of the advertisement break.

$$\text{new error} = \text{old error} + (\text{effective} - \text{scheduled})$$

$$\text{new error} = 2 + (118 - 120) = 0 \quad (2)$$

The error value, however, may increase during the second advertisement break 508 if there are delays in starting any of the advertisements, or if playout stalls momentarily during the playout of one or more advertisements 509-513. For example, there are delays 514 associated with the second advertisement break 508 due to delays in fetching and beginning to play out of each of the selected advertisements 509-513 (0.5 second delay shown as the crosshatched areas in FIG. 5A). Since the scheduled duration of 120 seconds has been reduced to 118 seconds, and since there is 1.5 seconds of delay 514 for the three 30 second advertisements 509-513, a total of 26.5 seconds remains in the second advertisement break 508 after the advertisements 509-513 have been played. In one embodiment, the media player 200 selects an additional advertisement (not illustrated) to fill the 26.5 seconds, such as with a 25 second advertisement that takes 1.5 second to begin playing, reducing the error value to zero upon returning to play the live multimedia content 510. In another embodiment, the media player 200 fills the remaining time of the second advertisement break 508 with filler content 515. In one embodiment, the filler content 515 is a static image to be displayed for the remaining time in the advertisement break 508. For example, the static image may be of a product or a brand name or logo, such as the publisher's logo, the logo for the live event, or other advertisement information. In another embodiment, the filler content 510 is a short advertisement that can loop until the end of the second advertisement break 508 that can easily be truncated. In another embodiment, the filler content 510 may be a black screen or a status screen indicating the time until the regular program will resume on the media player 200. Alternatively, the filler content 510 may include other content to fill the remaining time of the second advertisement break 508. After the second advertisement break 508, the media player returns to play the live multimedia content 510 at time 00:32:00 with an error value of zero.

It should be noted that although this technique of reducing the subsequently-scheduled duration by the current error value tends to keep the error value very low, this technique may reduce the number of standard-duration advertisements that can be played during the adjusted advertisement breaks. For example, the 118-second advertisement break from the example above cannot be used for four 30-second advertisements. If only 30-second advertisements are available, then at most three 30-seconds advertisements may be played, leaving 28 seconds that must be filled with other content.

In another embodiment, the media player 200 can force the advertisement breaks to have an adjusted duration that is a multiple of specified constant. A number of benefits can be obtained by introducing a little more flexibility into the process by adjusting the duration of an advertisement break to be a multiple of some constant in duration. For example, this can avoid having advertisement breaks of arbitrary durations that leave intervals that are difficult to fill, like the 28 seconds or 26.5 seconds left over after playing as many 30-second advertisements as possible. It should be noted that the error value may be any real number, e.g., 2.713 seconds. If this were deducted from a 120-second advertisement break, the adjusted duration would be 117.287 seconds. However, if the duration of the advertisement break is rounded up to the next multiple of some constant, then this difficulty is avoided. For example, the constant might be five seconds. In this case, even if the only available advertisements are of 15, 30, and 60 seconds in duration, then filler content of five and ten seconds would be sufficient to fill out advertisement breaks of any possible multiple of five seconds.

If the constant is chosen to be the same duration as the shortest standard-advertisement duration, then there is no need for filler content 510 at all, since all adjusted advertisement breaks will be a chosen so that they can be filled by standard-duration advertisements. For example, assume that advertisements are always 15, 30, or 60 seconds in duration. Assume further that the error value is 3.7 seconds and that the next advertisement break is scheduled to be 65 seconds. The duration of the advertisement break would be adjusted to be 61.3 seconds (65−3.7=61.3 seconds), then rounded up to 75 seconds. A 75-second advertisement break is easily filled by standard-sized advertisements. It should be noted that a 65-second advertisement break is a real possibility, even though only 15-, 30-, and 60-seconds advertisements are sold. It is generally the case that live Internet video events come from broadcast television. The television broadcast advertisement break might consist of 60 seconds of advertisements plus a 5-second promotional piece that is not appropriate for Internet distribution.

While the rounding-up behavior temporarily increases the error value in some cases, the error value can be reduced in one or more subsequent advertisement breaks. For example, the depicted timeline 525 of FIG. 5B includes two advertisement breaks 504 and 508 of 65 seconds each, and two seconds of delay are experienced in each advertisement break, indicated by delays 526 and 528, respectively (shown as the crosshatched areas in FIG. 5B). The first advertisement break 504 is adjusted by the error value, and then rounded up to the next multiple of a specified constant (e.g., 15 seconds), as expressed in the following equation (3).

$$\text{adjusted\_duration} = (\text{scheduled\_duration} - \text{current\_error\_value}) \Rightarrow \text{rounded}$$

$$\text{adjusted\_duration} = (65-0) \Rightarrow \text{rounded} = 75 \quad (3)$$

After the two-second delay in the first advertisement break 504, the error value is 12 seconds (EV=0+(77−65)=12). After playing the live multimedia content 506, the error value is 12 seconds before the second advertisement break 508 (assumes no increase in the error). The media player 200 can adjust the scheduled duration by the error value (adjusted duration=65−12=53 seconds), and then can round the adjusted duration to the next multiple of the specified constant (rounded to 60 seconds). After the second advertisement break 508, with its two seconds of delay 528, the accumulated error is nine seconds (EV=12+(62−65)=9). Seven seconds are attributed to rounding up the advertisement break duration to a multiple of 15 seconds, plus two seconds of delay 528 experienced during the second advertisement break 508. Although the error value is nine seconds after the second advertisement break 508, this error value is less than the error value after the first advertisement break 504 (12 seconds).

This technique has the result of consolidating odd durations of advertisement breaks into intervals that can be used for standard advertising. For example, if there is a sequence of three two-minute and ten-second advertisement breaks, the odd ten-second intervals in the advertisement breaks may be unusable for advertising even though they add up to 30 seconds. However, by adjusting the duration of the advertisement breaks, these odd intervals can be distributed among the advertisement breaks so that they can be used for two 15-second advertisements or one 30-second advertisement. For example, the three advertisement breaks of 2:10, 2:10, and 2:10 could be adjusted to 2:30, 2:00 and 2:00, or the like.

In general, when this technique is in use, the error value at the beginning of any advertisement break is less than or equal to the constant rounding value, and the error at the end of the advertisement break may be greater because of delays experienced during the advertisement break. There is no upper bound on the error value introduced during an advertisement break, since the viewer's Internet connection may fail during the advertisement break. However, when averaged over many viewers and advertisement breaks, the error value should tend to be around half the rounding constant value.

If it is desirable to keep the error value low, while still reaping some of the benefits of this technique, the constant value can be chosen to be small, for example five seconds, or even one second. However, when the constant value is less than the duration of the shortest advertisement, filler content (e.g., 510) must be produced to occupy any odd remaining time in an advertisement break.

It should also be noted that delay can occur during the playout of the regular content, not just during advertisement breaks. For example, stalling may occur because bandwidth available to the media player is temporarily reduced or because a sudden load is placed on the viewer's computer. Such delays will increase the error value just as surely as delays in an advertisement break will. The technique described herein attempts to reduce the error, introduced during playout of the regular content, just like it reduces the error introduced during advertising-related errors. Error may also be introduced by erroneous data associated with the advertisement. For example, the advertisement may indicate that it is 30 seconds in duration, but when played, is actually 28.5 seconds, or 32.5 seconds, increasing or decreasing the error value, respectively.

In another embodiment, when a viewer joins a live program during an advertisement break, the media player 200 can use the same algorithm to determine what advertisements to play before returning to the regular program. For example, a viewer may join when there are 47.5 seconds left in an advertisement break. Applying the same algorithm, when the error value is zero, the 47.5 seconds may be rounded up using the rounding constant, for example, 15 seconds, to 60 seconds adjusted duration for the advertisement break, resulting in an error value of 12.5 seconds. If there are any delays starting the advertisements in this initial advertisement break, they are also added to the error value. The scheduled duration of the advertisement break can be adjusted on the point of entering an advertisement break by the media player. This may allow a viewer to join a live stream in an advertisement break at the live horizon, or at another point other than the live horizon in the advertisement break. In one embodiment, the media player 200 receives a request from a user (i.e., viewer) to start playback of the multimedia content of the live event on the media player. In one embodiment, the request from the user is received during an advertisement break of the live event. The advertisement manager 220 adjusts the scheduled duration of the advertisement break to an adjusted duration that is different than the scheduled duration. The point of entering the advertisement is when the request is processed by the media player 200. Alternatively, the point of entering the advertisement may be determined to be at other points in time, such as when the request was made by the user, when the media player 200 is able to fetch and start playback of a selected advertisement, or the like. In one embodiment, the advertisement manager 220 determines the duration remaining in the first advertisement break from the point of entering the first advertisement break. For example, the original scheduled duration may have been 60 seconds, but the viewer joins the live program with 47.5 seconds remaining in the advertisement break. Instead of selecting one or more advertisements to fill 60 seconds, the advertisement manager 220 selects one or more advertisements to fill the adjusted duration of the advertisement break. In one embodiment, the advertisement manager 220 fills the remaining duration with a 30-second advertisement and a 15-second advertisement. Assuming the advertisement manager 220 experiences 2.5 seconds delay in fetching and playing the selected advertisements, the media player returns to play the multimedia content that immediate follows the advertisement break at the end of the advertisement break as scheduled. In another embodiment, the advertisement manager 220 rounds up the adjusted duration to a multiple of the standard durations of the available advertisements. For example, the advertisement manager 220 may schedule two 30-second advertisements, and return to play the multimedia content after the playback of the two advertisements. As described herein, this increases the error value, which may or may not be corrected in one or more subsequent advertisement breaks. In one embodiment, the media player 200 plays back the one or more selected advertisements in their entirety during the advertisement break filling the adjusted duration, which is greater than the duration remaining in the first advertisement break, and returns to play the multimedia content at the end of the one or more advertisements in the first break. In one embodiment, the media player returns to a target playback point in the multimedia content that is after a starting point in the multimedia content that immediately follows the first advertisement break, skipping a portion of the multimedia content. In another embodiment, the media player 200 returns to a starting point in the multimedia content that immediately follows the first advertisement break, so as to not skip any portion of the multimedia content.

As an alternative to knowing the expected duration of the advertisement break before starting playback of the advertisement is to just play the advertisements until you receive a signal or a message that the break has ended. In one embodiment, the scheduled duration is adjusted to an adjusted duration based on receipt of an end-of-advertisement marker. The end-of-advertisement marker indicates when the scheduled advertisement break ends. The media player 200 receives the end-of-advertisement marker during playback of the selected one or more advertisements for playback during the advertisement break. In one embodiment, the media player 200 stops playback of a currently playing advertisement upon receiving the end-of-advertisement marker, and returns to play the multimedia content at the end of the first advertisement without skipping any portion of the multimedia content. In another embodiment, the media player 200 plays back the selected advertisements in their entirety. The media player 200 may return to play the multimedia content at a target playback point (e.g. live horizon) in the multimedia content that is after a starting point in the multimedia content that follows the first advertisement break. This effectively skips the portion between when the end-of-advertisement marker is received and the live horizon. Alternatively, the media player 200 returns to play the multimedia content at a point that the end-of-advertisement marker is received by the media player 200 without skipping any portion of the multimedia content. This effectively increases the error value, as described herein. As described herein, the media player 200 plays the advertisement for a give break duration, even if the duration is not known at the beginning of the advertisement break. The media player 200 may apply any of the techniques described herein at any point during the advertisement break. In essence, the point of knowing the actual break duration could be made available at the beginning, middle, or end of the advertisement break, and the adjustments can be made accordingly by the media player 200.

In another embodiment, the depicted timeline 550 of FIG. 5C includes two advertisement breaks 504 and 508, one having a scheduled duration of 80 seconds and the other 75 seconds. Assuming the available advertisements have durations of 15, 30, or 60 seconds, the rounding constant value is 15 seconds, and the error value is zero at the beginning of the first advertisement break 504, the duration of the first advertisement break 504 is rounded up from its scheduled duration of 80 seconds to 90 seconds so that it will be a multiple of 15 seconds in duration. Three 30-second advertisements 551-555 are selected to fill the first advertisement break 504. Assuming there is a two-second delay 552 starting each advertisement (shown as the crosshatched areas in FIG. 5C). Given that there are three advertisements of 30 seconds each and three delays of two seconds each in playing out the advertisement break, a total of 96 seconds is required to play the entire advertisement break (effective or actual duration). Since the error value was zero at the beginning of the first advertisement break 504, the error value at the end of the first advertisement break 504 is 16 seconds, calculated as the old error plus the effective duration of the advertisement break less the scheduled duration (error value=0+(96−80)=16). At the beginning of the next advertisement break 508, the error value (EV=16) is subtracted from the duration of the scheduled advertisement break (75 seconds), yielding 59 seconds. This value is rounded up to the adjusted value of 60 seconds. The 60-second break is filled with two 30-second advertisements. Once again, there is a two-second delay 554 in starting the playout of each advertisement (shown as the crosshatched areas in FIG. 5C). The effective duration of the advertisement break is 64 seconds. Therefore, the accumulated error at the end of the advertisement break is five seconds, calculated as the old error plus the difference between the effective duration and the scheduled duration (new error=16+(64−75)=5 seconds).

By allowing the error value to temporarily increase by a small value, the following benefits may result. Using the technique described above, the advertisement manager can adjust for delays introduced during playout of the live event itself, delays in playing out advertisements, and odd-duration advertisement breaks experienced by viewers joining an event during an advertisement break. Using the technique described above, the advertisement manager can consolidate and use odd intervals of time, which would otherwise not be suitable for advertising, to display advertisements. Using the technique described above, the advertisement manager can avoid odd-duration advertisement breaks, which can reduce or eliminate the need to produce filler content of various durations.

In the embodiments described above, the media player 200 or the advertisement manager 220 selects one or more advertisements to fill the advertisement breaks before the advertisement breaks. As described above, there are some delays that can affect the error value and can affect when the viewer returns to the live multimedia content. In other embodiments, the media player 200 or the advertisement manager 220 can make decisions about whether to adjust the duration of the advertisement break while playing the one or more selected advertisements during the advertisement break, as described below.

In the embodiments described above, the advertisements are not truncated. Due to delays caused during the playout of advertisements, and even during playout of the live multimedia content, when the end of an advertisement break is reached, an advertisement may not have been played completely. The embodiments described herein are directed at providing a flexible approach to address these delays in subsequent advertisement breaks, but in other embodiments, the advertisements can be truncated, skipped, or even replaced to more closely match the effective duration to the scheduled duration of the advertisement break, as described below. Without the flexible approach of adjusting the scheduled durations and filling the adjusted durations, instead of the scheduled durations, the media player 200 may decide whether to let the error value increase by playing the advertisement completely whether to truncate, skip, or replace the advertisements, and/or whether to keep the viewer from missing portions of the live event, especially the portion immediately following the scheduled advertisement breaks. It should be noted that while truncating the advertisement can reduce the error value to zero, truncating may have the following disadvantages: 1) Truncating advertisements may be disconcerting to viewers. This may result in lower viewer satisfaction and ultimately lower viewership. 2) Truncating advertisements may also reduce possible revenue. Advertisers have a strong interest in having their advertisements viewed in their entirety. Advertisers may resist paying for advertisements that are truncated, negotiate a lower rate if they know that a percentage of advertisements will be truncated, or avoid advertising with a publisher that truncates advertisements.

If the desire is to keep the error value low, the media player 200 or advertisement manager 220 can decide what to do at the end of the scheduled advertisement break when the advertisement is still playing out. For example, assume the advertisement break is 60 seconds and that it is scheduled to be occupied by two 30-second advertisements. At the end of scheduled advertisement break (60 seconds after it started), there may be two seconds remaining in the last advertisement because of delays before or during the playout of the individual advertisements (illustrated in the timeline of FIG. 6). At this point there are at least four options: 1) The last advertisement may be truncated, preserving the lag behind live at the beginning of the advertisement break, but interfering with the advertising (which may potentially reducing advertisement revenue and may be disconcerting to the viewer). 2) The last advertisement may be played in its entirety, but the player may skip the first two seconds of the following program content, sacrificing the viewer experience in order to reduce the error value. 3) The last advertisement may be played in its entirety, and then the player may resume playing the program content that immediately follows the advertisement break. This preserves the integrity of the advertising and does not cause the viewer to miss any content, but the error increases by two seconds. Without using the embodiments described above to adjust the scheduled durations, there may be no opportunity to reduce the error later. 4) The last advertisement may be replaced by filler content that can easily be truncated. This will keep the error value low at the expense of sacrificing advertisement revenue and possibly also annoying the viewer who might have to endure viewing the same filler content repeatedly instead of seeing varied advertising.

Figure 6:
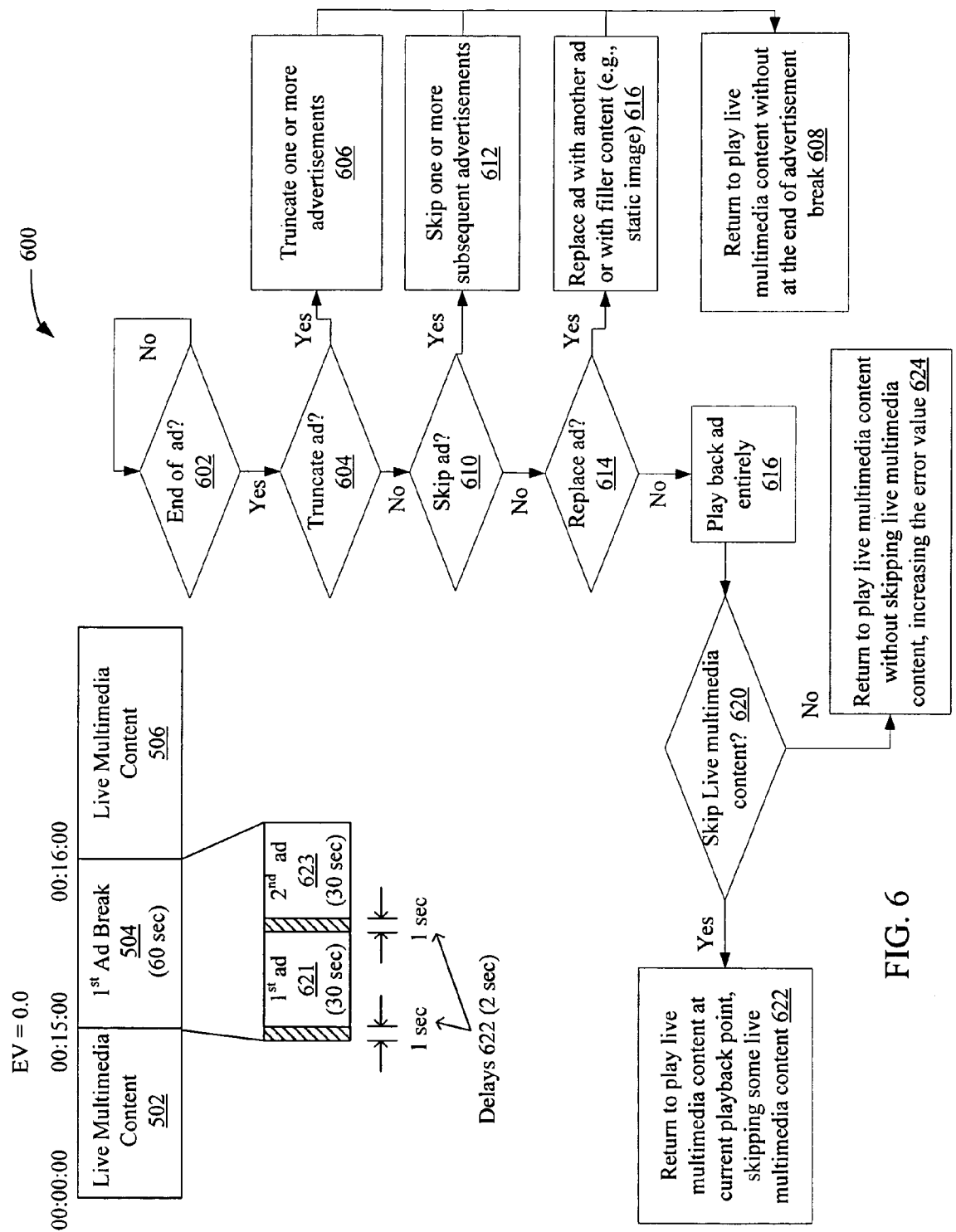
FIG. 6 is a flow diagram of another embodiment of a method of managing advertisements for a live multimedia event.

FIG. 6 is a flow diagram of another embodiment of a method of managing advertisements for a live multimedia event. The method 600 is performed by processing logic that may include hardware (circuitry, dedicated logic, or the like), software (such as is run on a general purpose computer system or a dedicated machine), or a combination of both. In one embodiment, method 600 is performed by the media player 200 of FIG. 2 or 3A. In another embodiment, the method 600 is performed by the advertisement manager 220 of FIG. 2.

During the first advertisement break 504, having a scheduled duration of 60 seconds, two 30-second advertisements 621 and 623 are scheduled to be played. During playout of the first and second advertisements 621 and 623, the media player 200 experiences two seconds of delays 622 (shown as the crosshatched areas in FIG. 6). During playout of the first and second advertisements 621 and 623, processing logic determines if the first advertisement 621 is at or near the end (602). The processing logic can make this determination at a specified time before the end of the advertisement, 5 or 10 seconds before, for example. Similarly, the processing logic can perform this determination at or near the end of each advertisement or at or near the end of the advertisement break. In another embodiment, the processing logic starts the method 600 at other points in the first advertisement break, such as, for example, just after the last advertisement 623 has started, allowing the delay 622 to be taken into account.

If the processing logic determines that the first advertisement 621 is not at the end, the processing logic loops until the end of the advertisement break is reached. If the end of the advertisement 621 is reached, the processing logic determines whether to adjust one or more subsequent scheduled advertisements of the first advertisement break 504 to more closely match an effective duration of the advertisement break 504, as played by the media player, to the first scheduled duration (60 seconds) than playback of the one or more advertisements without any adjustment. For example, since the effective duration will be 62 seconds, instead of the scheduled duration of 60 seconds, the processing logic determines whether to truncate the advertisement 504 (block 604) to more closely match the effective duration of the advertisement break to the scheduled duration. If the processing logic determines to truncate, the processing logic truncates one or more subsequent advertisements (block 606). For example, the processing logic can truncate the last two seconds of the second advertisement 623, and return to play the live multimedia content at the end of the first advertisement break 504 (block 608). This allows the viewer to continue with the live program at the specified time 00:16:00 without missing any portion of the live event, but cutting off the second advertisement 623. By truncating, the error value can be reduced, even to zero in some cases.

Some publishers may choose to truncate advertisements rather than endure the accumulation of any error value at all. They may do this because they are willing to sacrifice potential advertisement revenue and disrupt the viewer experience with regard to advertising in order to keep the error value as low as possible, due to the nature of their live multimedia content. For example, the content may be of a time-sensitive nature, or the viewer may be following the event through other media such as radio, broadcast television, or Internet messaging while viewing the event via Internet video.

If the processing logic determines not to truncate, the processing logic can determine whether to skip one or more advertisements (block 610). As described above, there may be advantages to playing an advertisement to completion once it has begun to play. Even with this restriction, there is no requirement that every advertisement originally-selected for an advertisement break must be played. So, instead of truncating, in some cases where the delay is high enough to exceed the duration of one or more advertisements remaining in the advertisement break, the processing logic can skip one or more scheduled advertisements to be played during the first advertisement break. For example, if during the playout of the first advertisement 621, the processing logic determines that there has been a delay of 30 seconds or more, the processing logic may skip, or otherwise not play the second advertisement 623 (block 612), and return to play the live multimedia content at the end of the first advertisement break 504 (block 608). This allows the viewer to continue with the live program at the specified time 00:16:00 without missing any portion of the live event, but skipping the second advertisement 623. By skipping advertisements, the error value can be reduced, even to zero in some cases. For another example, assume that the accumulated error at the beginning of an advertisement break is 12 seconds. The advertisement break's adjusted duration is 75 seconds, which is scheduled to be filled with two 30-second advertisements followed by a 15-second advertisement. If three or more seconds of delay occur before or during the playout of the first two advertisements, then the accumulated error will be at least 15 seconds when the time comes to play the final advertisement. In this example, by skipping the advertisement 623, the error value can be reduced by 15 seconds without disrupting the viewer experience.

In some cases, instead of replacing one advertisement for another, the processing logic may not play an advertisement and fill the remaining time of the first advertisement break with filler content (e.g., 510), keeping the error value low. For example, if there has only been a delay of 15 seconds during playout of the first advertisement 621, the processing logic may not play the second advertisement 623 and fill the remaining time of the first advertisement break 504 with filler content, keeping the error value at zero. Some publishers may choose to play filler content rather than advertising at the end of an advertisement break. The filler content might be static images or video that is designed to be repeated and/or truncated. This approach is simple and allows the advertisement break to terminate at the scheduled time by truncating the display of the content at the required time. Viewers may get tired, however, of seeing one or a small set of filler content over and over.

If the processing logic determines not to truncate or skip advertisements, the processing device can determine whether to replace one or more advertisements (block 614). If so, the processing logic can replace the one or more advertisements with another advertisement having a specified duration than the replaced advertisement(s) (block 616), and return to play the live multimedia content at the end of the first advertisement break 504 (block 608). For example, if there has been a delay of 15 seconds during the first advertisement 621, the processing logic may replace the 30-second scheduled advertisement 623 with another 15-second advertisement. Alternatively, the processing logic can replace the 30-second scheduled advertisement 623 with 15 seconds of filler content. In another embodiment, the error value may be reduced by substituting an advertisement with an advertisement having a shorter duration. For example, assume that an advertisement break's adjusted duration is 60 seconds, two 30-second advertisements are selected to fill the break, and the accumulated error is 12 seconds at the beginning of the advertisement break. If three or more seconds of delay occur before or during the early portion the first advertisement, then if enough time remains for an advertisement decision and the startup process playing an advertisement, an advertisement decision request can be made for a 15-second advertisement to be substituted for the second advertisement in the advertisement break. Again, the substitution reduces the error amount by 15 seconds without disrupting the viewer experience. Replacing advertisements may allow the viewer to return to the live multimedia content 506 at the specified time 00:16:00 without missing any portion of the live event. By replacing advertisements or filling with filler content, the error value can be reduced, even to zero in some cases.

If the processing logic determines not to replace one or more advertisements, the processing logic plays the first and second advertisements 621 and 623 in their entirety during the first advertisement break 504 (block 616) to fill the adjusted duration, which is greater than the scheduled duration. Before the end of the first advertisement break 504, the processing logic determines whether to skip live multimedia content (block 620). If so, the processing logic returns to play the multimedia content at the target playback point (e.g., 357), skipping some live multimedia content (block 622). Due to delays in the playout of the advertisements (e.g., distribution and acquisition delays 358 and 359), the target playback point 357 is after a starting point in the multimedia content that follows the advertisement break. If the processing logic determines not to skip the live multimedia content, the processing logic returns to play the live multimedia content without skip any content, increasing the error value (block 624). In this case, the adjusted duration is greater than the scheduled duration, increasing the error value by 2 seconds (due to the delays 622). The error value can be adjusted later in one or more subsequent advertisement breaks, or the error value can continue to increase for each of the one or more subsequent advertisement breaks.

In some cases, some publishers may not care about minimizing the error value. They may simply want to play advertisements to fill each scheduled advertisement break, possibly rounding the size of each advertisement break up in order to accommodate advertisements of standard sizes. They may not care about the error value because the event is an Internet-only event and the viewers are unlikely to know that they are slipping further and further behind the live point as the event progresses. This may allow a publisher, for example, to promote the event as "live event," instead of a piece of VOD content, for marketing reasons in order to build viewer interest and attract as much viewership as possible, for example.

In some cases, the duration of an advertisement break may not be known to the media player 200 before the advertisement break begins. In this embodiment, the media player 200 receives the information about when the advertisement break should begin. It then selects and plays advertisements up until the time that it receives the information about when the advertisement break is scheduled to end. At this point the media player 200 can calculate the originally-scheduled duration of the ad break by subtracting the time that the advertisement break was scheduled to begin from the time that the advertisement break was scheduled to end. Once this value is known, the media player 200 can implement substantially the same behavior as it would have had the advertisement break duration been known in advance with regard to whether to extend the advertisement break, truncate an advertisement, replace an advertisement with another advertisement of another duration, play filler content, or the like, as described herein. It should be noted that the media player 200 should not change decisions about advertisements that have already played, and the media player 200 should take any necessary actions in time to receive any relevant information, such as to make requests to an external ADS, for example, and react to this information before the next advertisement is to begin playing.

In other cases, the duration of the advertisement break may initially be set to a default value when the advertisement break begins, for example, because only the fact that the advertisement break has begun is known, and then the advertisement break duration can be changed to the true value once the end of the advertisement break is detected. This may occur in situations where the source of the live event is a live television broadcast, and the start and end of advertisement breaks are communicated to the encoding system as they occur, but the duration of the advertisement breaks is never communicated. In this case, any time the duration of an advertisement break changes, even during the course of the advertisement break itself, the media player 200 can react as described above, such as, extending the advertisement break, truncating an advertisement, replacing an advertisement with another advertisement of another duration, playing filler content, or the like.

Figure 7:
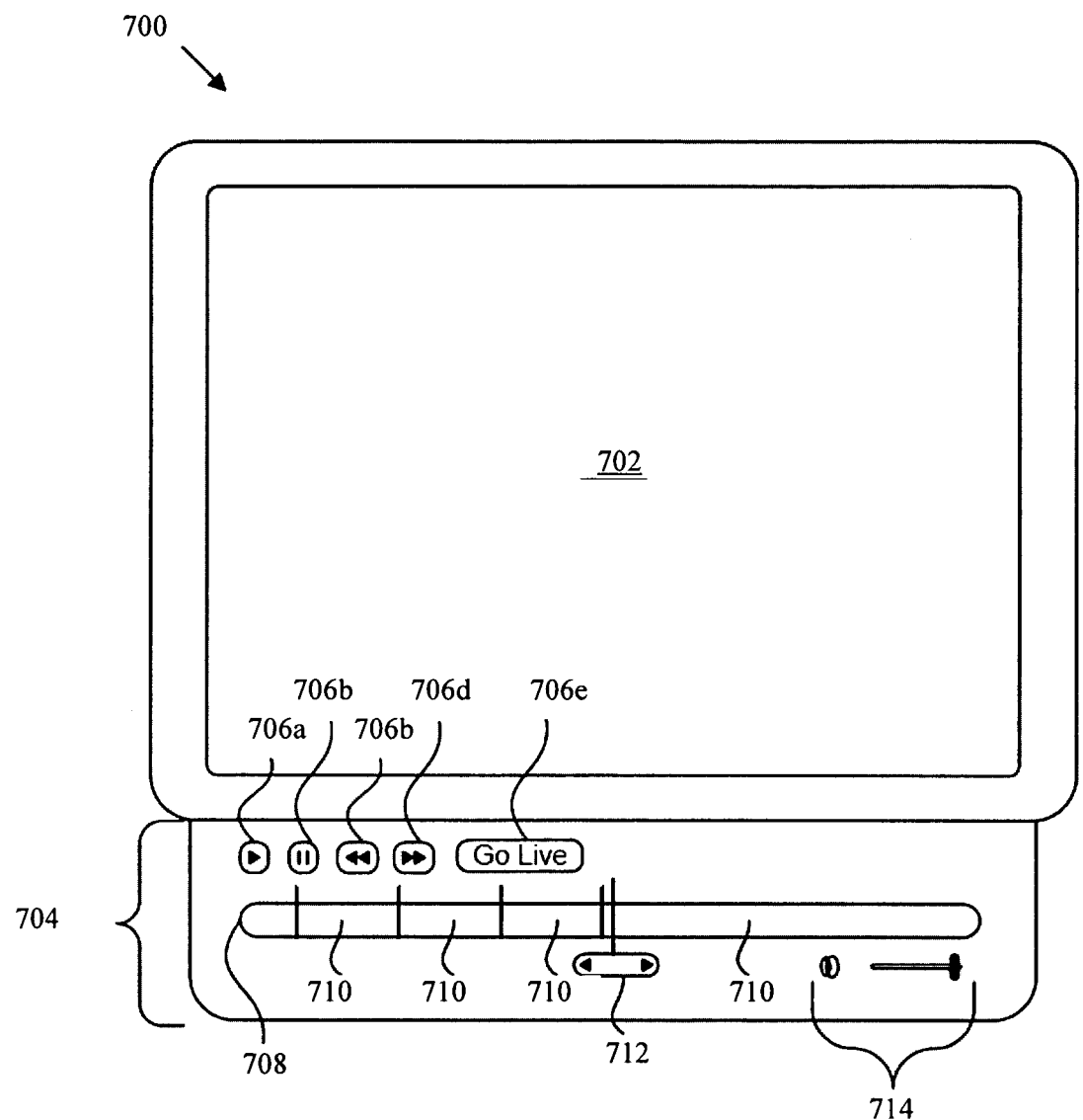
FIG. 7 illustrates a graphical user interface (GUI) of a media player in accordance with one embodiment.

FIG. 7 illustrates a GUI 700 of the media player 200 in accordance with one embodiment. The depicted GUI 700 of the media player 200 includes a viewing area 702 located above a control area 704. The viewing area 702 is configured to display the decoded and rendered multimedia content and advertisements, and may be resized according to a personal preference, or in order to accommodate various forms of audio/video. The control area 704 includes buttons 706 for controlling playback of the multimedia content. The buttons may include, but are not limited to, play 706a, pause 706b, rewind 706c, and fast forward 706d.

In the depicted embodiment, the GUI 700 further includes a timeline 708 that is configured to represent the available content. The timeline 708 is similar to a programming guide for a TV station. The portions 710, as depicted, may correspond with different television shows, or portions within the same television show. The status bar 712 indicates the current position relative to the timeline 708 of the content. In one embodiment, the status bar 712 may be "dragged" to the right in order to fast forward through the content and likewise to the left in order to rewind. The GUI 700 of the media player 200 may also include volume controls 714. The programs playing at selected times may also be listed on the timeline 708. The GUI 700 may include other buttons that correspond to additional functionality of the media player 200, such as adjusting the playback window to full-screen, mini-mode, a pop-out player window, additional playlist or content navigation aids.

In one embodiment, the media player 200 generates the GUI 700. The media player 200 may be software that is downloaded to the client device 104 prior to the user viewing the requested video. The media player 200 may be an add-on or plug-in to a web browser, or may be a stand-alone application by itself. In one embodiment, the client device 104 requests a video to stream, and the content server 102 provides the client device 104 with the media player 200 that generates the GUI 700 in which video may be displayed in the viewing area 702. In another embodiment, the client device 104 requests to download the player and installs the media player 200 on the client device 104 before requesting the video to stream. Alternatively, other configurations are possible, such as hosting the media player 200 from another device on the network, but displaying the GUI 700 on the client device 104, or the like.

FIG. 7 illustrates by way of example only, and one skilled in the art would appreciate that the GUI 700 of the media player 200 may be implemented with many different styles and orientations according to the available functionality of the media player 200.

Figure 8:
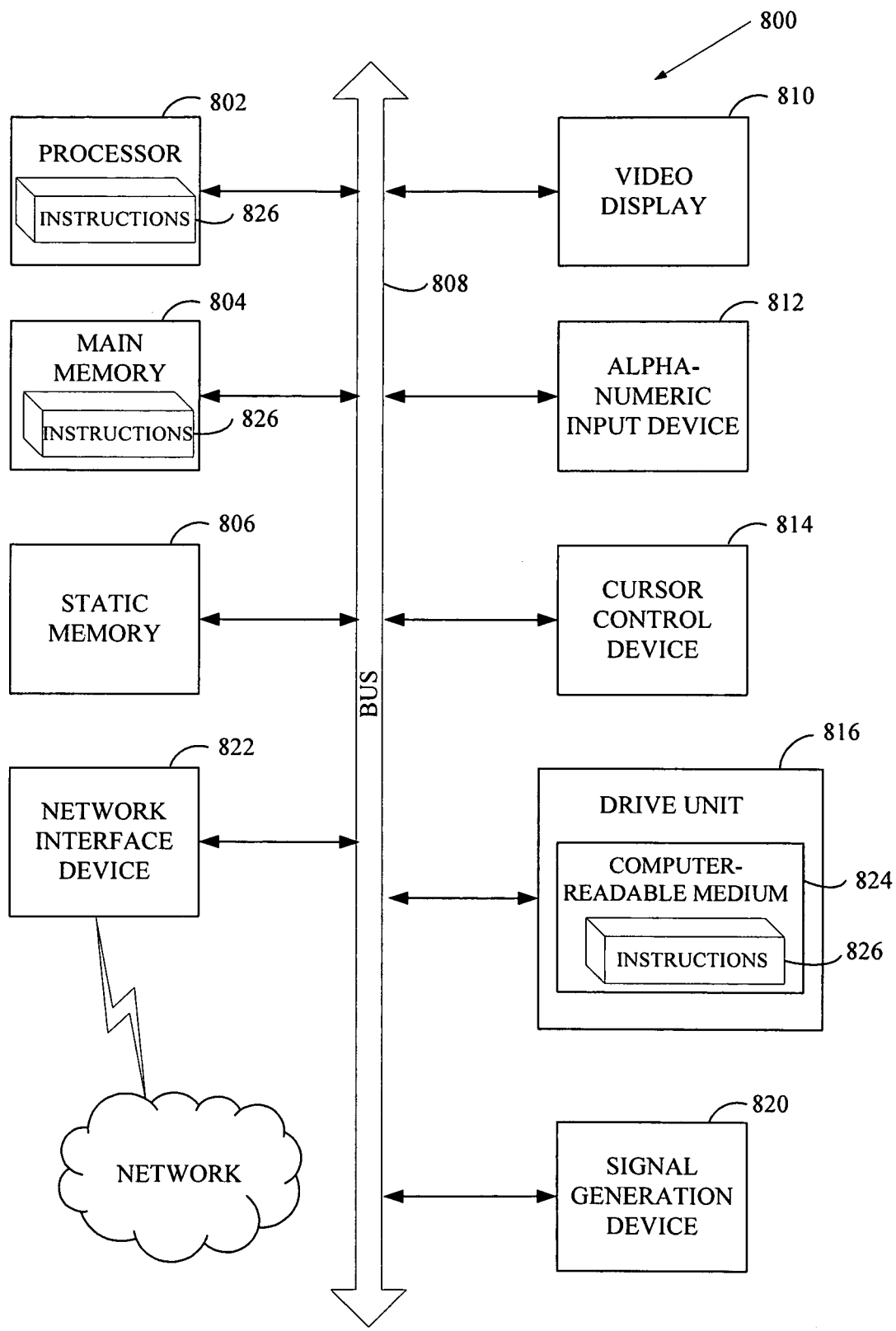
FIG. 8 illustrates a diagrammatic representation of a machine in the exemplary form of a computer system within which a set of instructions, for causing the machine to perform any one or more of the methodologies discussed herein, may be executed.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), EPROMs, EEPROMs, flash memory, dynamic random access memory (DRAM) such as synchronous DRAM (SDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-readable storage medium (or more specifically a computer-readable storage medium) 831 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-readable storage media. The software 822 may further be transmitted or received over a network 820 via the network interface device 808.

While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media, non-volatile memory (NVM), and the like.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A client device for managing multimedia content comprising advertisements for a live event, wherein the multimedia content of the live event is broadcast at a specified point in time, wherein the multimedia content comprises one or more advertisement breaks in the multimedia content, each having a scheduled start time and a scheduled duration, wherein the client device is a computing device, and wherein the client device comprises:
   an interface configured to provide a network connection to the Internet; and
   a media player operating on the computing device, the media player including an advertisement manager,
      the media player configured to receive the multimedia content over the network connection for playback by the media player,
      the media player configured to receive a first advertisement marker that indicates a first start time and a first scheduled duration of a first advertisement break,
      the advertisement manager configured to adjust the first scheduled duration to a first adjusted duration that is different than the first scheduled duration, wherein the first adjusted duration reduces a lag in playback of the live event behind the specified point in time that the live event is broadcast; and
      the advertisement manager configured to select one or more advertisements for playback on the client device to fill the first adjusted duration of the first advertisement break, instead of the first scheduled duration, to thereby reduce the lag in playback of the live event by the media player behind the specified point in time that the live event is broadcast.

2. The client device of claim 1, wherein the first advertisement break is a scheduled advertisement break at a scheduled point in time after the beginning of the live event.

3. The client device of claim 1, wherein at least one of the one or more advertisements comprises a multimedia advertisement.

4. The client device of claim 1, wherein the first adjusted duration is shorter than the first scheduled duration so that the difference between the time that the live event is broadcast and the time that the live event is provided for playback is greater before the first adjusted duration than after.

5. The client device of claim 1, wherein the first adjusted duration is one of a plurality of standard durations of available advertisements for playback on the media player, and wherein the plurality of standard durations are multiples of a specified constant, wherein the specified constant is the shortest duration of the plurality of standard durations.

6. The client device of claim 1, wherein the advertisement manager is to adjust the first scheduled duration to the first adjusted duration as a function of the first scheduled duration and a first error value indicative of the media player's playback lag behind the specified point in time that the live event is broadcast.

7. The client device of claim 6, wherein the first error value is the difference in time between when a portion of the multimedia content is available to the media player via Internet distribution and when the portion is played back on the media player, and wherein the advertisement manager determines the first error value by
   determining an actual lag-behind-live value, wherein the actual lag-behind-live value is the difference in time between a particular point in time in the live event and when a portion of the multimedia content corresponding to the particular point in time is played back on the media player, and
   subtracting a minimum possible lag-behind-live value, wherein the minimum possible lag-behind-live value is the difference in time between the particular point in time in the live event and when the portion of the multimedia content is available to the media player via Internet distribution.

8. The client device of claim 7, wherein the advertisement manager determines the first error value before the first start time of the first advertisement break.

9. The client device of claim 6, Wherein the media player is to receive, during playback of the multimedia content, a second advertisement marker that indicates a second start time and a second scheduled duration of a second advertisement break, and wherein the advertisement manager is to select one or more advertisements for playback to fill the second adjusted duration of the second advertisement break, instead of the second scheduled duration.

10. The client device of claim 9, wherein the advertisement manager is to adjust the second scheduled duration to a second adjusted duration that is different than the second scheduled duration, and to select one or more advertisements for playback to fill the second adjusted duration of the second advertisement break, instead of the second scheduled duration.

11. The client device of claim 10, wherein the advertisement manager is to adjust the second scheduled duration to the second adjusted duration by subtracting the first error value from the second scheduled duration to obtain the second adjusted duration.

12. The client device of claim 10, wherein the advertisement manager is to adjust the second scheduled duration to the second adjusted duration as a function of the second scheduled duration, the first error value, and an additional fixed value.

13. The client device of claim 10, wherein the advertisement manager is to adjust the second scheduled duration to the second adjusted duration by
subtracting the first error value from the second scheduled duration to obtain a first value; and
rounding the first value up to be a second value that is a multiple of a specified constant, wherein the second value is the second adjusted duration, and wherein the specified constant is the shortest duration of the durations of available advertisements for playback on the client device.

14. The client device of claim 10, wherein the advertisement manager is to adjust the second scheduled duration to the second adjusted duration by skipping an individual advertisement of the one or more advertisements selected for playback during the second advertisement break.

15. The client device of claim 10, wherein the advertisement manager is to adjust the second scheduled duration to the second adjusted duration by replacing an advertisement of the one or more advertisements, having a first duration, with another advertisement of a second duration that is different from the first duration.

16. The client device of claim 1, wherein the advertisement manager is to select the one or more advertisements for playback by
sending a request over the network connection to an advertisement decision service (ADS) operating on a remote server; and
receiving identities of the one or more advertisements for playback in response to the request.

17. The client device of claim 16, wherein the request comprise information comprises at least one of local time of the media player, one or more keywords, the geographic location of the media player, an Internet Protocol (IP) address, a preference of a user of the media player, or one or more demographics of the user.

18. A computer-implemented method executable by a client device to manage advertisements for a live event, wherein multimedia content of the live event is broadcast at a specified point in time, wherein the multimedia content comprises one or more advertisement breaks in the multimedia content, each having a scheduled start time and a scheduled duration, the method comprising:
receiving, by the client device the multimedia content over a network connection for playback on a media player operating on the client device;
receiving a first advertisement marker that indicates a first start time and a first scheduled duration of a first advertisement break;
adjusting, by the client device, the first scheduled duration to a first adjusted duration that is different than the first scheduled duration, wherein the first adjusted duration reduces a lag behind the specified point in time that the live event is broadcast; and
selecting, by the client device, one or more advertisements for playback on the media player to fill the first adjusted duration of the first advertisement break instead of the first scheduled duration to thereby reduce the lag in the playback of the live event by the client device behind the specified point in time that the live event is broadcast.

19. The method of claim 18, further comprising determining a first error value indicative of the media players lag behind live before the first start time of the first advertisement break, wherein determining the first error value comprises:
determining an actual lag-behind-live value, wherein the actual lag-behind-live value is the difference in time between a particular point in time in the live event and when a portion of the multimedia content corresponding to the particular point in time is played back on the media player; and
subtracting a minimum possible lag-behind-live value, wherein the minimum possible lag-behind-live value is the difference between the particular point in time in the live event and when the portion of the multimedia content is available to the media player via Internet distribution.

20. The method of claim 19, further comprising:
receiving, during playback of the multimedia content, a second advertisement marker that indicates a second start time and a second scheduled duration of a second advertisement break; and
selecting one or more advertisements for playback to fill the second adjusted duration of the second advertisement break, instead of the second scheduled duration.

21. The method of claim 20, wherein adjusting the second scheduled duration to the second adjusted duration comprises:
subtracting the first error value from the second scheduled duration to obtain a first value; and
rounding the first value up to be a second value that is a multiple of a specified constant, wherein the specified constant is the shortest duration of the durations of available advertisements for playback on the media player, and wherein the second value is the second adjusted duration.

22. The method of claim 20, wherein adjusting the second scheduled duration to the second adjusted duration comprises skipping an individual advertisement of the one or more advertisements for playback during the second advertisement break.

23. The method of claim 18, wherein the first scheduled duration is adjusted to the first adjusted duration based on a point of entering the first advertisement break, and wherein the method further comprises receiving a request from a user of the media player to start playback of the multimedia content of the live event on the media player, wherein the request from the user is received during the first advertisement break of the live event, and wherein the point of entering the first advertisement is when the request is processed by the media player.

24. The method of claim 23, further comprising determining a duration remaining in the first advertisement break from the point of entering the first advertisement break.

25. The method of claim 23, further comprising returning to play the multimedia content at the end of the first advertisement break.

26. The method of claim 25, further comprising playing back the one or more advertisements in their entirety during the first advertisement break to fill the first adjusted duration, and wherein the first adjusted duration is greater than the duration remaining in the first advertisement break, and wherein the method further comprises returning to play the multimedia content at the end of the one or more advertisements in the first advertisement break.

27. The method of claim 26, wherein returning to play the multimedia content comprises returning to a target playback point in the multimedia content that is after a starting point in the multimedia content that follows the first advertisement break, and wherein returning to the target playback point skips a portion of the multimedia content.

28. A computer-implemented method executable by a client device to present multimedia content representing a live event to a user, wherein the live event is broadcast at a specified point in time, the method comprising:
- receiving the multimedia content for playback on a media player operating on the client device, wherein the multimedia content is received at the client device via a network connection;
- receiving an advertisement marker at the client device that indicates a start time and a scheduled duration of an advertisement break in the multimedia content;
- adjusting, by the client device, the scheduled duration to an adjusted duration that is shorter than the scheduled duration;
- selecting, by the client device, one or more advertisements for playback on the media player to fill the adjusted duration of the advertisement break instead of the scheduled duration to thereby reduce a lag in playback of the live event behind the specified point in time that the live event is broadcast; and
- providing the multimedia content and the selected advertisements for playback from the media player of the client device.

29. The method of claim 28, further comprising determining an error value indicative of the lag behind the specified point in time, wherein determining the error value comprises:
- determining an actual lag-behind-live value, wherein the actual lag-behind-live value is the difference in time between a particular point in time in the live event and a time when a portion of the multimedia content corresponding to the particular point in time is played back on the media player; and
- subtracting a minimum possible lag-behind-live value, wherein the minimum possible lag-behind-live value is the difference between the particular point in time in the live event and a time that the portion of the multimedia content is available to the media player via the network.

30. The method of claim 29, further comprising:
- receiving, during playback of the multimedia content, a second advertisement marker that indicates a second start time and a second scheduled duration of a second advertisement break; and
- selecting one or more advertisements for playback to fill the second adjusted duration of the second advertisement break, instead of the second scheduled duration.

31. The method of claim 30, wherein adjusting the second scheduled duration to the second adjusted duration comprises;
- subtracting the error value from the second scheduled duration to obtain a first value; and
- rounding the first value up to be a second value that is a multiple of a specified constant, wherein the specified constant is the shortest duration of the durations of available advertisements for playback on the media player, and wherein the second value is the second adjusted duration.

* * * * *